US012617912B2

(12) United States Patent
Nakai et al.

(10) Patent No.: US 12,617,912 B2
(45) Date of Patent: May 5, 2026

(54) LAMINATE AND MEDICAL DEVICE

(71) Applicant: FUJIFILM Corporation, Tokyo (JP)

(72) Inventors: Yoshihiro Nakai, Kanagawa (JP); Kazushi Furukawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 330 days.

(21) Appl. No.: 18/325,120

(22) Filed: May 30, 2023

(65) Prior Publication Data

US 2023/0303789 A1 Sep. 28, 2023

Related U.S. Application Data

(63) Continuation of application No. PCT/JP2021/043515, filed on Nov. 29, 2021.

(30) Foreign Application Priority Data

Dec. 24, 2020 (JP) ................................ 2020-215765

(51) Int. Cl.
*C08J 7/04* (2020.01)
*B32B 27/28* (2006.01)
(Continued)

(52) U.S. Cl.
CPC .......... *C08J 7/0423* (2020.01); *B32B 27/283* (2013.01); *C08J 7/043* (2020.01); *C08J 9/365* (2013.01);
(Continued)

(58) Field of Classification Search
CPC . C08J 7/0423; C08J 7/043; C08J 9/365; C08J 7/0427; C08J 9/26; B32B 27/283; C09D 183/14; C08G 79/00
See application file for complete search history.

(56) References Cited

U.S. PATENT DOCUMENTS

| | | | | |
|---|---|---|---|---|
| 11,285,697 B2 | 3/2022 | Murata et al. | | |
| 2010/0189993 A1* | 7/2010 | Mori | .......................... | C08J 7/05 428/317.5 |

(Continued)

FOREIGN PATENT DOCUMENTS

| | | |
|---|---|---|
| CN | 107921731 | 4/2018 |
| CN | 110168417 | 8/2019 |

(Continued)

OTHER PUBLICATIONS

Chen et al., Directly ambient pressure dried robust bridged silsesquioxane and methylsiloxane aerogels: effects of precursors and solvents, RSC Adv., 2019, 9, 8664-8671 (Year: 2019).*

(Continued)

*Primary Examiner* — Blaine Copenheaver
(74) *Attorney, Agent, or Firm* — JCIPRNET

(57) ABSTRACT

Provided is a laminate having high sterilization resistance and suitable as a medical device constituent component and a medical device including the laminate. The laminate has a substrate, an interlayer on the substrate, and a polymer coating layer on the interlayer. The interlayer has a porous layer including a siloxane compound, and the siloxane compound has at least one of a constituent component derived from a compound bearing a reactive functional group and a hydrolyzable group or a constituent component derived from a compound bearing a hydrolyzable group having a reactive functional group.

22 Claims, 1 Drawing Sheet

(51) Int. Cl.
*C08J 7/043* (2020.01)
*C08J 9/36* (2006.01)

(52) U.S. Cl.
CPC ........ *C08J 2300/22* (2013.01); *C08J 2363/00* (2013.01)

(56) References Cited

U.S. PATENT DOCUMENTS

| | | | |
|---|---|---|---|
| 2016/0250830 A1 | 9/2016 | Kiya et al. | |
| 2017/0190203 A1* | 7/2017 | Imakura | B41M 5/38214 |
| 2018/0250913 A1 | 9/2018 | Kotake et al. | |

FOREIGN PATENT DOCUMENTS

| | | |
|---|---|---|
| EP | 3392036 | 3/2022 |
| JP | 2003291256 | 10/2003 |
| JP | 2007177073 | 7/2007 |
| JP | 2010149294 | 7/2010 |
| JP | 2015096326 | 5/2015 |
| JP | 2018130853 | 8/2018 |
| JP | 2019151710 | 9/2019 |
| WO | 2017038779 | 3/2017 |
| WO | 2017111121 | 6/2017 |
| WO | 2019065772 | 4/2019 |

OTHER PUBLICATIONS

"International Search Report (Form PCT/ISA/210) of PCT/JP2021/043515," mailed on Feb. 8, 2022, with English translation thereof, pp. 1-5.

"International Preliminary Report on Patentability (Form PCT/IPEA/409) of PCT/JP2021/043515," completed on Jul. 25, 2022, with English translation thereof, pp. 1-12.

"First Office Action of China Counterpart Application", issued on Jan. 19, 2026, with partial English translation thereof, p. 1-p. 11.

* cited by examiner

LAMINATE AND MEDICAL DEVICE

CROSS-REFERENCE TO RELATED APPLICATIONS

This application is a Continuation of PCT International Application No. PCT/JP2021/043515 filed on Nov. 29, 2021, which claims priority under 35 U.S.C. § 119 (a) to Japanese Patent Application No. 2020-215765 filed in Japan on Dec. 24, 2020. Each of the above applications is hereby expressly incorporated by reference, in its entirety, into the present application.

BACKGROUND OF THE INVENTION

1. Field of the Invention

The present invention relates to a laminate and a medical device.

2. Description of the Related Art

Siloxane compounds (polysiloxane compounds) are excellent in heat resistance, flexibility, and the like and are widely used as functional materials in the food field, the medical field, and the like. For example, JP2019-151710A discloses a laminate having a support and a cured film on the support. The cured film is obtained by curing a silicone resin composition including an organopolysiloxane having a specific structure, an organosilicon compound having a specific structure, a mineral filler having a specific refractive index and band gap, and a phosphoric acid-based catalyst. According to the technique described in JP2019-151710A, the laminate can reflect ultraviolet rays at a high rate to produce an enhanced sterilization effect in sterilization treatment using ultraviolet rays and has high resistance to ultraviolet rays.

JP2010-149294A, JP2003-291256A, and WO2017/111121A disclose laminates each having a substrate and a siloxane compound-containing layer on the substrate.

SUMMARY OF THE INVENTION

Medical devices used for examining or treating the human body are required to have high degrees of cleanliness, and needs to be washed and disinfected with chemicals after each use.

In particular, medical devices that are inserted into or applied to blood vessels, the trachea, the digestive tract, or other body cavities or tissues are required to have high cleanliness at the level of sterilization exceeding disinfection in order to prevent bacterial infection. As such sterilization treatment, sterilization treatment with ethylene oxide gas (EOG) has been widely performed, and application of hydrogen peroxide plasma treatment has also been desired.

The surface of a medical device that is subjected to such sterilization treatment is often constituted by a polymer coating layer having a single-layer or multi-layer structure, and the polymer coating layer is formed so as to be close contact with an underlying substrate. When such a laminate is repeatedly subjected to sterilization treatment as described above, constituent materials of the laminate may be, for example, degraded, resulting in a decrease in adhesiveness between polymer layers constituting the laminate or between a polymer layer and a substrate. This decrease in adhesion causes a decrease in medical device performance. Therefore, constituent members of medical devices are required to have high sterilization resistance.

It is an object of the present invention to provide a laminate having high sterilization resistance and suitable as a medical device constituent component and a medical device including the laminate.

In view of the above-described problems, the present inventors have conducted studies on the formation of a polymer coating layer in a laminate. The studies have demonstrated that the above problems can be solved by employing a configuration in which an interlayer is disposed between a substrate and a polymer coating layer, the interlayer having a porous layer including a siloxane compound, and further incorporating a constituent component derived from a compound bearing a reactive functional group and a hydrolyzable group independent of each other or a constituent component derived from a compound bearing a hydrolyzable group having a reactive functional group into the siloxane compound constituting the porous layer. The present invention has been completed by further conducting studies based on these findings.

The above object of the present invention has been achieved by the following means.

<1>

A laminate having a substrate, an interlayer on the substrate, and a polymer coating layer on the interlayer, wherein the interlayer has a porous layer including a siloxane compound, and the siloxane compound has at least one of a constituent component derived from a compound bearing a reactive functional group and a hydrolyzable group or a constituent component derived from a compound bearing a hydrolyzable group having a reactive functional group.

<2>

The laminate according to <1>, wherein the porous layer has an average pore size of 50 nm to 100 μm.

<3>

The laminate according to <2>, wherein the porous layer has an average pore size of 100 nm to 10 μm.

<4>

The laminate according to any one of <1> to <3>, wherein the reactive functional group includes at least one of an amino group, a (meth)acryloyl group, a mercapto group, a phosphorus-containing group, or an acyl group.

<5>

The laminate according to any one of <1> to <4>, wherein the interlayer is the porous layer, the siloxane compound included in the porous layer is a dehydrated condensate of at least one of an alkoxysilane compound or a hydroxysilane compound and at least one of a silane coupling agent, a titanium alkoxide compound, a zirconium alkoxide compound, or an aluminum alkoxide compound, and the silane coupling agent, the titanium alkoxide compound, the zirconium alkoxide compound, and the aluminum alkoxide compound have the reactive functional group.

<6>

The laminate according to <5>, wherein the siloxane compound included in the porous layer is a dehydrated condensate of at least one of an alkoxysilane compound or a hydroxysilane compound and a silane coupling agent, and the silane coupling agent has the reactive functional group.

<7>

The laminate according to any one of <1> to <6>, wherein the substrate includes at least one of iron, a nonferrous metal, an inorganic material other than metal, or an organic material.

<8>

The laminate according to <7>, wherein the nonferrous metal includes at least one of aluminum, titanium, magnesium, nickel, copper, lead, zinc, tin, chromium, tungsten, cobalt, or an alloy of at least two of these metals.

<9>

The laminate according to <7>, wherein the inorganic material other than metal includes at least one of glass or ceramic.

<10>

The laminate according to <7>, wherein the organic material includes at least one of a thermoplastic resin or a thermosetting resin.

<11>

The laminate according to any one of <1> to <10>, wherein the interlayer has the porous layer and a primer layer on the porous layer.

<12>

The laminate according to <11>, wherein the primer layer has a reactive functional group.

<13>

The laminate according to <12>, wherein the reactive functional group of the primer layer includes at least one of an amino group, a (meth)acryloyl group, an epoxy group, a mercapto group, an acid anhydride group, a phosphorus-containing group, a hydroxy group, a carboxy group, a sulfonyl group, or an acyl group.

<14>

The laminate according to any one of <11> to <13>, wherein the primer layer includes at least one of a silane coupling agent, a titanium alkoxide compound, an aluminum alkoxide compound, or a zirconium alkoxide compound.

<15>

The laminate according to <14>, wherein the primer layer includes at least one of a titanium alkoxide compound, an aluminum alkoxide compound, or a zirconium alkoxide compound.

<16>

The laminate according to <15>, wherein the primer layer includes a titanium alkoxide compound.

<17>

The laminate according to any one of <14> to <16>, wherein the titanium alkoxide compound is a compound represented by general formula (a) or (b):

$$R^{1a}_{m1}\text{—Ti—}(OR^{2a})_{4\text{-}m1} \quad \text{General formula (a):}$$

$$O\text{—}[\text{Ti—}(OR^{2a})_3]_2 \quad \text{General formula (b):}$$

where $R^{1a}$ represents a hydrogen atom, an alkyl group, a cycloalkyl group, an acyl group, an aryl group, or an unsaturated aliphatic group, $R^{2a}$ represents a hydrogen atom, an alkyl group, a cycloalkyl group, an acyl group, an alkenyl group, an aryl group, a phosphonate group, or $—SO_2R^{S1}$, where $R^{S1}$ represents a substituent, and m1 is an integer of 0 to 3.

<18>

The laminate according to <17>, wherein the compound represented by general formula (a) or (b) includes at least one atom selected from the group consisting of N, P, and S.

<19>

The laminate according to <14> or <15>, wherein the aluminum alkoxide compound includes a compound represented by general formula (c) or (d):

$$R^{1b}_{m2}\text{—Al—}(OR^{2b})_{3\text{-}m2} \quad \text{General formula (c):}$$

$$O\text{—}[\text{Al—}(OR^{2b})_2]_2 \quad \text{General formula (d):}$$

where $R^{1b}$ represents a hydrogen atom, an alkyl group, a cycloalkyl group, an acyl group, an aryl group, or an unsaturated aliphatic group, $R^{2b}$ represents a hydrogen atom, an alkyl group, a cycloalkyl group, an acyl group, an alkenyl group, an aryl group, a phosphonate group, or $—SO_2R^{S2}$, where $R^{S2}$ represents a substituent, and m2 is an integer of 0 to 2.

<20>

The laminate according to <19>, wherein in general formulae (c) and (d), at least one $OR^{2b}$ has an acetonato structure or an acetato structure.

<21>

The laminate according to <14> or <15>, wherein the zirconium alkoxide compound is a compound represented by general formula (e) or (f):

$$R^{1c}_{m3}\text{—Zr—}(OR^{2c})_{4\text{-}m3} \quad \text{General formula (e):}$$

$$O\text{—}[\text{Zr—}(OR^{2c})_3]_2 \quad \text{General formula (f):}$$

where $R^{1c}$ represents a hydrogen atom, an alkyl group, a cycloalkyl group, an acyl group, an aryl group, or an unsaturated aliphatic group, $R^{2c}$ represents a hydrogen atom, an alkyl group, a cycloalkyl group, an acyl group, an alkenyl group, an aryl group, a phosphonate group, or $—SO_2R^{S3}$, where $R^{S3}$ represents a substituent, and m3 is an integer of 0 to 3.

<22>

The laminate according to <21>, wherein in general formulae (e) and (f), at least one $OR^{2c}$ has an acetonato structure, an acetato structure, or a lactato structure.

<23>

The laminate according to any one of <1> to <22>, wherein the polymer coating layer includes at least one of a thermoplastic polymer or a thermosetting polymer.

<24>

The laminate according to any one of <1> to <23>, wherein the polymer coating layer includes a thermoplastic polymer.

<25>

A medical device including the laminate according to any one of <1> to <24> as a constituent member.

In this specification, the term "metal alkoxide compound (specifically, for example, an aluminum alkoxide compound, a zirconium alkoxide compound, and a titanium alkoxide compound described later)" refers to a compound having a structure in which at least one alkoxy group is bonded to a metal atom. The alkoxy group may have a substituent. The substituent may be monovalent or divalent (e.g., an alkylidene group). Furthermore, two alkoxy groups bonded to one metal atom may be bonded to each other to form a ring.

In this specification, when there are a plurality of substituents, linking groups, or the like (hereinafter referred to as "substituents or the like") represented by a particular symbol or when a plurality of substituents or the like are specified simultaneously or alternatively, the substituents or the like may be the same or different. Furthermore, even if not specifically stated, when a plurality of substituents or the like are adjacent to each other, they may be linked or fused to each other to form a ring.

In this specification, substituents (as well as linking groups) not explicitly stated as substituted or unsubstituted may have any substituent as long as the desired effects are produced. The same applies to compounds that are not specified as substituted or unsubstituted.

In this specification, when the number of carbon atoms of a group is specified, the number of carbon atoms means the number of carbon atoms of the whole group. That is, when the group further has a substituent, the number of carbon atoms means the number of carbon atoms of the whole including the substituent.

In the present invention, the term "reactive functional group" is used in a broader sense than usual. That is, in addition to a group that causes a reaction with another group to form a covalent bond or the like, a group that causes an interaction (ionic interaction, hydrogen bonding, or the like) with another group is included. In the present invention, an unsubstituted alkoxy group is not a structure having a reactive functional group.

The laminate of the present invention has high sterilization resistance and is suitable as a medical device constituent component. The medical device of the present invention including the laminate as a constituent component has high sterilization resistance.

DESCRIPTION OF THE PREFERRED EMBODIMENTS

Laminate

Figure 1:
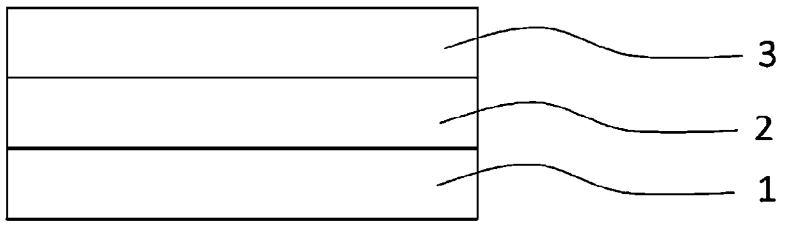
FIG. 1 is a longitudinal sectional view schematically showing a laminate according to an embodiment of the present invention.

Hereinafter, a laminate of the present invention will be described with reference to FIG. 1.

The laminate of the present invention has a substrate, an interlayer on the substrate, and a polymer coating layer on the interlayer. The interlayer has a porous layer, and the porous layer includes a siloxane compound having at least one of a constituent component derived from a compound bearing a reactive functional group and a hydrolyzable group or a constituent component derived from a compound bearing a hydrolyzable group having a reactive functional group. The laminate of the present invention in the form shown in FIG. 1 has a substrate 1, a porous layer 2 (an interlayer 2) including the siloxane compound on the substrate 1, and a polymer coating layer 3 on the interlayer 2.

Hereinafter, a "porous layer including a siloxane compound having a constituent component derived from a compound bearing a reactive functional group and a hydrolyzable group or a constituent component derived from a compound bearing a hydrolyzable group having a reactive functional group" may be referred to as a "siloxane compound-containing porous layer".

The laminate of the present invention has high sterilization resistance. Although the reasons are not clear, this can be explained in part by the interaction between the polymer coating layer 3 and the reactive functional group included in the siloxane compound-containing porous layer 2 and, in addition, an anchor effect due to the entrance into pores of the siloxane compound-containing porous layer 2. The hydrolyzable group having a reactive functional group is hydrolyzed in the synthesis of the siloxane compound to separate from the compound, and almost all the hydrolyzable group is included in a free state in the porous layer. Even in this form, the free compound derived from the reactive functional group probably contributes effectively to, for example, the adhesion between the porous layer and a layer adjacent thereto through, for example, the interactive properties due to the polarity of the free compound.

Substrate

The substrate of the present invention is not particularly limited, and those used for constituent members of ordinary medical devices can be widely employed.

Specifically, the substrate preferably includes at least one of iron, a nonferrous metal, an inorganic material other than metal, or an organic material.

The iron also includes an alloy of iron and a nonferrous metal. An example of such an alloy is stainless steel.

Examples of the nonferrous metal include aluminum, titanium, magnesium, nickel, copper, lead, zinc, tin, chromium, tungsten, cobalt, vanadium, gold, and alloys of at least two of these metals, and aluminum, titanium, magnesium, nickel, copper, lead, zinc, tin, chromium, tungsten, cobalt, and alloys of at least two of these metals are preferred.

Examples of the inorganic material other than metal include glass and glass ceramic.

Examples of the glass include soda glass, Pyrex (registered trademark) glass, quartz glass, and alkali-free glass.

Examples of the ceramic include alumina, zirconia, silicon carbide, and silicon nitride.

The organic material is, for example, a thermoplastic resin or a thermosetting resin.

Examples of the thermoplastic resin include thermoplastic polyimide resins, thermoplastic polyamide resins, polyetherimide resins, polyphenylene ether resins, polycarbonate resins, polyethylene terephthalate resins, polyethylene naphthalate resins, polyphenylene sulfide resins, polyether ether ketone resins, polyethersulfone resins, acrylic resins, polyolefin resins such as polyethylene resins, polypropylene resins, and polymethylpentene resins, and thermoplastic polycycloolefins such as thermoplastic polynorbornenes.

Examples of the thermosetting resin include thermosetting polyimide resins, thermosetting polyamide resins, polyamide-imide resins, epoxy resins, phenol resins, styrene resins such as polystyrene resins, ABS resins (acrylonitrile-butadiene-styrene copolymer resins), and acrylonitrile-styrene copolymer resins, and thermosetting polycycloolefins such as thermosetting polynorbornenes.

As the organic material, a thermosetting polymer or a thermoplastic polymer included in the polymer coating layer described later can also be employed. That is, in the laminate of the present invention, the substrate and the polymer coating layer can be formed of the same polymer.

The physical properties of the substrate, such as flexibility and stiffness, can be appropriately determined according to the medical device to which the laminate is applied. The same applies to the thickness of the substrate. The thickness of the substrate can be, for example, 0.1 to 50 mm, and may be 0.5 to 10 mm.

The content of at least one of iron, a nonferrous metal, an inorganic material other than metal, or an organic material included in the substrate is not particularly limited, and can be, for example, 80 mass % or more, preferably 90 mass % or more, and may be 100 mass %.

Siloxane Compound-Containing Porous Layer

The interlayer constituting the laminate of the present invention has a siloxane compound-containing porous layer. The siloxane compound-containing porous layer has a large number of pores (voids) in the layer. Examples of the shape of the pores include a spherical shape and an ellipsoidal shape. The pores may be independent pores, or the independent pores may combine to form a continuous pore.

The average pore size in the siloxane compound-containing porous layer is not particularly limited, and from the viewpoint of sterilization resistance, it is, for example, preferably 50 nm to 100 μm, more preferably 100 nm to 10 μm, still more preferably 500 nm to 5 μm, even more preferably 800 nm to 2.5 μm. In this specification, the average pore size is a value determined by a method described in EXAMPLES given later.

The porosity of the siloxane compound-containing porous layer is not particularly limited, and is, for example, preferably 10% to 80%, more preferably 20% to 60%, still more preferably 30% to 50%. In this specification, the "porosity" is the proportion of the volume of pores to the volume of the entire porous layer including the pores and is a value determined by a method described in EXAMPLES given later.

The average thickness of the siloxane compound-containing porous layer is not particularly limited, and is, for example, preferably 0.01 to 1000 μm, more preferably 0.05 to 500 μm, still more preferably 0.03 to 100 μm, even more preferably 0.1 to 50 μm. In this specification, the average thickness is a value determined by a method described in EXAMPLES given later.

The siloxane compound included in the siloxane compound-containing porous layer has a constituent component derived from a compound bearing a reactive functional group and a hydrolyzable group or a constituent component derived from a compound bearing a hydrolyzable group having a reactive functional group. The reactive functional group is not particularly limited, and from the viewpoint of sterilization resistance, it is preferably, for example, a reactive functional group other than a hydroxy group. Examples of the reactive functional group include an amino group, a (meth)acryloyl group, a mercapto group (sulfanyl group), a phosphorus-containing group, and an acyl group. From the viewpoint of sterilization resistance, the reactive functional group is preferably an amino group, a mercapto group, or a phosphorus-containing group.

The phosphorus-containing group means a monovalent substituent having at least one phosphorus atom. The number of phosphorus atoms included in the phosphorus-containing group is preferably 2 to 10, more preferably 2 to 5, still more preferably 2 or 3. The molecular weight of the phosphorus-containing group is not particularly limited and is, for example, 100 to 300. The phosphorus-containing group is meant to include a form having a partially substituted structure.

Examples of the phosphorus-containing group include monovalent substituents terminated with a phosphonic acid group.

Preferred specific examples of the phosphorus-containing group include monovalent organic groups bonded to a titanium atom through an oxygen atom, as included in TI-2, TI-3, TI-4, and TI-5 given later.

The acyl group means a monovalent substituent represented by "R—C(=O)—". The molecular weight of the acyl group is not particularly limited and is, for example, 40 to 300. R is, for example, an alkyl group or an aryl group and is preferably an alkyl group.

The alkyl group may be linear, branched, or cyclic. The number of carbon atoms of the alkyl group is preferably 1 to 30, more preferably 1 to 20, also preferably 1 to 10, also preferably 1 to 6. Specific examples of the alkyl group include methyl, ethyl, isopropyl, butyl, cyclopentyl, and heptadecyl.

The acyl group may also be included in the form of an acyloxy group.

The total proportion of the constituent component derived from a compound bearing a reactive functional group and a hydrolyzable group and the constituent component derived from a compound bearing a hydrolyzable group having a reactive functional group in all constituent components of the siloxane compound can be, for example, 0.1 to 30 mol % and is preferably 0.5 to 5 mol %.

The siloxane compound included in the siloxane compound-containing porous layer is a compound having a siloxane bond (repeating structure of [—Si—O]). The siloxane compound is, for example, an oligomer or a polymer obtained by allowing at least one of an alkoxysilane compound or a hydroxysilane compound and at least one of a silane coupling agent, a titanium alkoxide compound, a zirconium alkoxide compound, or an aluminum alkoxide compound to undergo hydrolysis reaction, followed by polycondensation. The silane coupling agent, the titanium alkoxide compound, the zirconium alkoxide compound, and the aluminum alkoxide compound have the reactive functional group.

The alkoxysilane compound (alkyloxysilane compound) is a silane compound having at least one alkoxy group and may have a hydroxy group. The hydroxysilane compound is a silane compound having a hydroxy group and does not have an alkoxy group.

The alkyl group in the alkoxy group may be linear, branched, or cyclic. The number of carbon atoms of the alkyl group is preferably 1 to 30, more preferably 1 to 20, still more preferably 1 to 10, even more preferably 1 or 2. Specific examples of the alkyl group include methyl, ethyl, isopropyl, butyl, and cyclopentyl.

The alkoxysilane compound and the hydroxysilane compound preferably do not have a reactive functional group other than a hydroxy group.

The alkoxysilane compound is, for example, a tetraalkoxysilane compound, a trialkoxysilane compound, or a dialkoxysilane compound.

Examples of the tetraalkoxysilane include, but are not limited to, tetramethoxysilane, tetraethoxysilane, tetrapropoxysilane, tetraisopropoxysilane, and tetrabutoxysilane.

Examples of the trialkoxysilane compound include, but are not limited to, methyltrimethoxysilane, methyltriethoxysilane, phenyltrimethoxysilane, and phenyltriethoxysilane.

Examples of the dialkoxysilane compound include, but are not limited to, dimethyldimethoxysilane and dimethyldiethoxysilane.

The hydroxysilane compound is not particularly limited and is, for example, a compound obtained by hydrolyzing an alkoxy group of the alkoxysilane compound to form a hydroxy group.

The weight-average molecular weight of the siloxane compound is not particularly limited, and is, for example, preferably 100 to 2000, more preferably 150 to 500.

The weight-average molecular weight or number-average molecular weight of compounds described in this specification is determined as follows.

The weight-average molecular weight or number-average molecular weight can be measured as a molecular weight in terms of polystyrene by gel permeation chromatography (GPC).

Specifically, it can be detected with an RI detector at 23° C. and a flow rate of 1 mL/min using a GPC apparatus HLC-8220 (trade name, manufactured by Tosoh Corporation), tetrahydrofuran as an eluant, and G3000HXL+G2000HXL (trade names, manufactured by Tosoh Corporation) as columns.

Examples of siloxane compounds that can be used in the present invention include, but are not limited to, compounds used in EXAMPLES given later.

The laminate of the present invention is meant to encompass a form in which the siloxane compound-containing porous layer has reacted with at least one of the substrate or the polymer coating layer. For example, the siloxane compound-containing porous layer can be present with a reactive functional group or a free compound derived therefrom included in the porous layer being reacted with a constituent metal of the substrate or with a group on the surface of the polymer coating layer. When the laminate of the present invention has a primer layer, the primer layer may be present with a reactive functional group or a free compound derived therefrom included in the porous layer being reacted with a compound or the like included in the primer layer.

The content of the siloxane compound in the siloxane compound-containing porous layer is preferably 50 mass % or more, more preferably 70 mass % or more, still more preferably 80 mass % or more, even more preferably 90 mass % or more. The siloxane compound-containing layer may be a layer made of a siloxane compound.

The siloxane compound-containing layer may include a component other than the siloxane compound as long as the advantageous effects of the present invention are not impaired. Examples of such a component include metal alkoxides other than the metal alkoxide used for forming the siloxane compound, binder resins, and stabilizers (surfactants and antioxidants).

Polymer Coating Layer

The polymer included in the polymer coating layer is not particularly limited. The polymer is, for example, a thermoplastic polymer or a thermosetting polymer and is preferably a thermoplastic polymer.

The thermoplastic polymer is, for example, a thermoplastic elastomer or a thermoplastic resin.

Examples of the thermoplastic elastomer include polyamide elastomers, polyester elastomers, fluorine-containing elastomers, polyurethane elastomers, and polyolefin elastomers.

The thermoplastic resin is, for example, the thermoplastic resin included in the "substrate" described above. Alternatively, an acrylic resin, a polyamide resin, or the like can also be used.

The thermosetting polymer is, for example, a thermosetting elastomer or a thermosetting resin.

Examples of the thermosetting elastomer include silicone elastomers, urethane elastomers, diene rubber, crosslinked olefin elastomers, and crosslinked fluorine-containing elastomers.

The thermosetting resin is, for example, the thermosetting resin included in the "substrate" described above. Alternatively, an epoxy resin, a phenol resin, or an unsaturated polyester resin can also be used.

The polymer coating layer may include components other than the polymer as long as the advantageous effects of the present invention are not impaired.

The thickness of the polymer coating layer can be appropriately determined according to the medical device to which the laminate is applied. The thickness can be, for example, 0.1 to 50 mm and may be 0.3 to 10 mm.

Primer Layer

In the laminate of the present invention, from the viewpoint of sterilization resistance, the interlayer preferably has a primer layer on the siloxane compound-containing porous layer.

In the laminate of the present invention, from the viewpoint of sterilization resistance, the primer layer preferably includes a compound having a reactive functional group, and the reactive functional group preferably includes at least one of an amino group, a (meth)acryloyl group, an epoxy group, a mercapto group, an acid anhydride group, a phosphorus-containing group, a hydroxy group, a carboxy group, a sulfonyl group, or an acyl group. In the primer layer, a form in which the reactive functional group is a hydroxy group is also preferred.

In the present invention, from the viewpoint of sterilization resistance, the primer layer preferably includes a hydroxy group and at least one of an amino group, a (meth)acryloyl group, an epoxy group, a mercapto group, an acid anhydride group, a phosphorus-containing group, a carboxy group, a sulfonyl group, or an acyl group, more preferably includes a hydroxy group and at least one of an amino group, a phosphorus-containing group, a carboxy group, a sulfonyl group, or an acyl group, still more preferably includes a hydroxy group and at least one of an amino group, a phosphorus-containing group, or a carboxy group.

In the present invention, from the viewpoint of sterilization resistance, the primer layer preferably includes at least one of a silane coupling agent, a titanium alkoxide compound, an aluminum alkoxide compound, or a zirconium alkoxide compound, more preferably includes at least one of a titanium alkoxide compound, an aluminum alkoxide compound, or a zirconium alkoxide compound, still more preferably includes a titanium alkoxide compound.

Silane Coupling Agent

As the silane coupling agent used in the present invention, standard silane coupling agents applicable in primer layers of constituent members of medical devices can be widely employed.

The silane coupling agent preferably does not have a siloxane bond, and preferably has a group other than methyl, ethyl, methoxy, and ethoxy (e.g., an amino group, a vinyl group, a propyl group, an acid anhydride group, an epoxy group, or a mercapto group).

Titanium Alkoxide Compound

As the titanium alkoxide compound (preferably a titanium coupling agent) used in the present invention, standard titanium alkoxide compounds applicable in primer layers of constituent members of medical devices can be widely employed.

The titanium alkoxide compound preferably includes at least one compound represented by general formula (a) or (b) below, more preferably includes at least one compound represented by general formula (a) below. The percentage of the total content of the compound represented by general formula (a) or (b) below in the titanium alkoxide compound is not particularly limited, and can be, for example, 60 mass % or more, preferably 80 mass % or more, more preferably 90 mass % or more, still more preferably 95 mass % or more, and may be 100 mass %.

$$R^{1b}_{m1}—Ti—(OR^{2a})_{4-m1} \quad \text{General formula (a):}$$

$$O—[Ti—(OR^{2a})_3]_2 \quad \text{General formula (b):}$$

$R^{1a}$ represents a hydrogen atom, an alkyl group, a cycloalkyl group, an acyl group, an aryl group, or an unsaturated aliphatic group.

The alkyl group, the cycloalkyl group, the acyl group, the aryl group, and the unsaturated aliphatic group may be, for example, an alkyl group, a cycloalkyl group, an acyl group, an aryl group, and an unsaturated aliphatic group, respectively, that can be employed as $R^{1b}$ in general formula (c) given later.

$R^{2a}$ represents a hydrogen atom, an alkyl group, a cycloalkyl group, an acyl group, an alkenyl group, an aryl group, a phosphonate group, or $—SO_2R^{S1}$. $R^{S1}$ represents a substituent.

The alkyl group, the cycloalkyl group, the acyl group, the alkenyl group, the aryl group, and the phosphonate group may be, for example, an alkyl group, a cycloalkyl group, an acyl group, an alkenyl group, an aryl group, and a phosphonate group, respectively, that can be employed as $R^{2b}$ in general formula (c) given later. The substituent that can be employed as $R^{S1}$ may be, for example, a substituent that can be employed as $R^{S2}$ in general formula (c) later.

m1 is an integer of 0 to 3.

The compound represented by general formula (a) or (b) above preferably includes at least one atom selected from the group consisting of N, P, and S. When the compound represented by general formula (a) or (b) has N, the compound preferably has N in the form of an amino group.

When the compound represented by general formula (a) or (b) has P, the compound preferably has P in the form of a phosphate group (phosphoric acid group) or a phosphonate group (phosphonic acid group).

When the compound represented by general formula (a) or (b) has S, the compound preferably has S in the form of a sulphonyl group ($—SO_2—$).

The compound represented by general formula (a) or (b) above may also have an acyl group as Rea, that is, an acetato structure described later as $OR^{2a}$.

Specific examples of the titanium alkoxide compound used in the present invention will be given below, but the present invention is not limited thereto. Isopropyl triisostearoyl titanate, isopropyl tridodecylbenzenesulfonyl titanate, isopropyl trioctanoyl titanate, isopropyl tri(dioctylphosphite) titanate, isopropyl tris(dioctylpyrophosphate) titanate, isopropyl tri(dioctylsulfate) titanate, isopropyl tricumylphenyl titanate, isopropyl tri(N-aminoethyl-aminoethyl) titanate, isopropyl dimethacrylisostearoyl titanate, isopropyl isostearoyldiacryl titanate, isobutyltrimethyl titanate, diisostearoyl ethylene titanate, diisopropyl bis(dioctylpyrophosphate) titanate, dioctyl bis(ditridecylphosphate) titanate, dicumyl phenyloxyacetate titanate, bis(dioctylpyrophosphate)oxyacetate titanate, bis(dioctylpyrophosphate) ethylene titanate, bis(dioctylpyrophosphate)oxyacetate titanate, tetraisopropyl titanate, tetrabutyl titanate, tetraoctyl titanate, tetrastearyl titanate, tetraisopropyl bis(dioctylphosphite) titanate, tetraoctyl bis(di-tridecylphosphite) titanate, tetra(2,2-diallyloxymethyl-1-butyl)bis(di-tridecyl)phosphite titanate, butyl titanate dimer, titanium tetraacetyl acetonate, titanium ethyl acetoacetate, titanium octylene glycolate, titanium di-2-ethylhexoxy bis(2-ethyl-3-hydroxyhexoxide)

Aluminum Alkoxide Compound

As the aluminum alkoxide compound (preferably an aluminum coupling agent) used in the present invention, standard aluminum alkoxide compounds applicable in primer layers of constituent members of medical devices can be widely employed.

The aluminum alkoxide compound preferably includes at least one compound represented by general formula (c) or (d) below, more preferably includes at least one compound represented by general formula (c) below. The percentage of the total content of the compound represented by general formula (c) or (d) below in the aluminum alkoxide compound is not particularly limited, and can be, for example, 60 mass % or more, preferably 80 mass % or more, more preferably 90 mass % or more, still more preferably 95 mass % or more, and may be 100 mass %.

$$R^{1b}_{m2}—Al—(OR^{2b})_{3-m2} \quad \text{General formula (c):}$$

$$O—[Al—(OR^{2b})_2]_2 \quad \text{General formula (d):}$$

$R^{1b}$ represents a hydrogen atom, an alkyl group, a cycloalkyl group, an acyl group, an aryl group, or an unsaturated aliphatic group.

The alkyl group that can be employed as $R^{1b}$ include linear alkyl groups, branched alkyl groups, and aralkyl groups. The number of carbon atoms of the alkyl group is preferably 1 to 20, more preferably 1 to 15, still more preferably 1 to 10, particularly preferably 1 to 8. In the case of an aralkyl group, the number of carbon atoms is preferably 7 to 30. Preferred specific examples of the alkyl group include methyl, ethyl, propyl, isopropyl, butyl, sec-butyl, isobutyl, tert-butyl, pentyl, hexyl, heptyl, octyl, decyl, tridecyl, octadecyl, benzyl, and phenethyl.

The alkyl group that can be employed as $R^{1b}$ may also have an oxirane ring. The number of annular atoms of a cycloalkyl group in an epoxycycloalkyl group (a cycloalkyl group having a structure in which an oxirane ring is fused thereto) that can be employed as $R^{1b}$ is preferably 4 to 8, more preferably 5 or 6, still more preferably 6 (i.e., an epoxycyclohexyl group).

The alkyl group that can be employed as $R^{1b}$ may also have a group selected from the group consisting of an amino group, an isocyanato group, a mercapto group, an ethylenically unsaturated group, and an acid anhydride group.

The number of carbon atoms of the cycloalkyl group that can be employed as $R^{1b}$ is preferably 3 to 20, more preferably 3 to 15, still more preferably 3 to 10, particularly preferably 3 to 8. Preferred specific examples of the cycloalkyl group include cyclopropyl, cyclopentyl, and cyclohexyl.

The number of carbon atoms of the acyl group that can be employed as $R^{1b}$ is preferably 2 to 40, more preferably 2 to 30, still more preferably 2 to 20, particularly preferably 2 to 18.

The number of carbon atoms of the aryl group that can be employed as $R^{1b}$ is preferably 6 to 20, more preferably 6 to 15, still more preferably 6 to 12, particularly preferably 6 to 10. Preferred specific examples of the aryl group include phenyl and naphthyl, and phenyl is more preferred.

The number of carbon-carbon unsaturated bonds of the unsaturated aliphatic group that can be employed as $R^{1b}$ is preferably 1 to 5, more preferably 1 to 3, still more preferably 1 or 2, particularly preferably 1. The unsaturated aliphatic group may include a heteroatom and may also be a hydrocarbon group. When the unsaturated aliphatic group is a hydrocarbon group, the number of carbon atoms is preferably 2 to 20, more preferably 2 to 15, still more preferably 2 to 10, even more preferably 2 to 8, also preferably 2 to 5. The unsaturated aliphatic group is more preferably an alkenyl group or an alkynyl group.

$R^{1b}$ is preferably a hydrogen atom, an alkyl group, a cycloalkyl group, or an aryl group, more preferably an alkyl group or a cycloalkyl group.

When the compound of general formula (c) has two or more $R^{1b}$ moieties, the two $R^{1b}$ moieties may be linked to each other to form a ring.

$R^{2b}$ represents a hydrogen atom, an alkyl group, a cycloalkyl group, an acyl group, an alkenyl group, an aryl group, a phosphonate group (phosphoric acid group), or $—SO_2R^{S2}$. $R^{S2}$ represents a substituent.

The alkyl group, the cycloalkyl group, the acyl group, and the aryl group that can be employed as $R^{2b}$ have the same meaning as the alkyl group, the cycloalkyl group, the acyl group, and the aryl group, respectively, that can be employed as $R^{1b}$, and preferred forms of each group are also the same. The alkyl group that can be employed as $R^{2b}$ may also have an amino group as a substituent.

The alkenyl group that can be employed as $R^{2b}$ includes linear alkenyl groups and branched alkenyl groups. The number of carbon atoms of the alkenyl group is preferably 2 to 18, more preferably 2 to 7, still more preferably 2 to 5. Preferred specific examples of the alkenyl group include vinyl, allyl, butenyl, pentenyl, and hexenyl. The alkenyl group is preferably a substituted alkenyl group.

The phosphonate group that can be employed as $R^{2b}$ is a group represented as $-P(=O)(-OR^{P1})OR^{P2}$. $R^{P1}$ and $R^{P2}$ represent a hydrogen atom or a substituent, and the substituent is preferably an alkyl group or a phosphonate group. The alkyl group that can be employed as $R^{P1}$ and $R^{P2}$ has the same meaning as the alkyl group that can be employed as $R^{1b}$ described above, and preferred forms of the alkyl group are also the same. The phosphonate group that can be employed as $R^{P1}$ and $R^{P2}$ has the same meaning as the phosphonate group that can be employed as $R^{2b}$, and preferred forms thereof are also the same. When $R^{P1}$ or $R^{P2}$ is a phosphonate group, $R^{P1}$ and $R^{P2}$ constituting the phosphonate group are preferably alkyl groups.

In the phosphonate group that can be employed as $R^{2b}$, preferably, both $R^{P1}$ and $R^{P2}$ are alkyl groups, or $R^{P1}$ is a hydrogen atom and $R^{P2}$ is a phosphonate group.

Since a phosphonate group and a phosphite group (phosphorous acid group) are tautomers of each other, the term "phosphonate group" in the present invention is meant to include a phosphite group.

In $-SO_2R^{S2}$ that can be employed as $R^{2b}$, the substituent $R^{S2}$ is preferably an alkyl group or an aryl group. Preferred forms of the alkyl group and the aryl group that can be employed as $R^{S2}$ include the preferred forms of the alkyl group and the aryl group that can be employed as $R^{1b}$ described above. In particular, $R^{S2}$ is preferably a phenyl group having an alkyl group as a substituent. Preferred forms of the alkyl group are the same as the preferred forms of the alkyl group that can be employed as $R^{1b}$ described above.

When the compound represented by general formula (c) has two or more $R^{2b}$ moieties, the two $R^{2b}$ moieties may be linked to each other to form a ring. In the compound represented by general formula (d), two $R^{2b}$ moieties may be linked to each other to form a ring.

m2 is an integer of 0 to 2.

In general formulae (c) and (d) above, at least one $OR^{2b}$ preferably has an acetonato structure. The acetonato structure means a structure coordinated to Al, the structure being derived by removing one hydrogen ion from acetone or a compound having a structure in which acetone has a substituent. The ligand atom coordinated to Al is typically an oxygen atom. The acetonato structure is preferably a structure that has an acetylacetone structure ("$CH_3-C(=O)-CH_2-C(=O)-CH_3$") as a basic structure with one hydrogen ion removed therefrom and that is coordinated to Al using an oxygen atom as a ligand atom (i.e., an acetylacetonato structure). The phase "have an acetylacetone structure as a basic structure" is meant to include the acetylacetone structure and, in addition, a structure derived by replacing a hydrogen atom of the acetylacetone structure with a substituent. Examples of forms in which $OR^{2b}$ has an acetonato structure include compounds AL-1 and AL-2 given later.

In general formulae (c) and (d) above, at least one $OR^{2b}$ preferably has an acetato structure. In the present invention, the acetato structure means a structure coordinated to Al, the structure being derived by removing one hydrogen ion from acetic acid, an acetate, or a compound having a structure in which acetic acid or an acetate has a substituent (including forms in which the methyl group of acetic acid has an alkyl group as a substituent). The ligand atom coordinated to Al is typically an oxygen atom. The acetato structure is preferably a structure that has an alkyl acetoacetate structure ("$CH_3-C(=O)-CH_2-C(=O)-O-R_{alk}$" ($R_{alk}$ represents an alkyl group (preferably an alkyl group having 1 to 20 carbon atoms, which may be an alkyl group having 1 to 10 carbon atoms and is more preferably an alkyl group having 1 to 4 carbon atoms) as a basic structure with one hydrogen ion removed therefrom and that is coordinated to Al using an oxygen atom as a ligand atom (i.e., an alkyl acetoacetato structure). The phase "have an alkyl acetoacetate structure as a basic structure" is meant to include the alkyl acetoacetate structure and, in addition, a structure derived by replacing a hydrogen atom of the alkyl acetoacetate structure with a substituent. Examples of forms in which $OR^{2b}$ has an acetato structure include compounds AL-2, AL-3, and AL-4 given later.

Each of the groups that can be employed as $R^{1b}$ or $R^{2b}$ may have, as a substituent, an anionic group having a counter cation (salt-type substituent). The anionic group means a group capable of forming an anion. The anionic group having a counter cation is, for example, a carboxylate ion group having an ammonium ion as a counter cation. In this case, the counter cation only needs to be present in the compound represented by general formula (c) or (d) above such that the entire compound has zero charge. The same applies to the compound represented by general formula (a) or (b) described above and a compound represented by general formula (e) or (f) described below.

Specific examples of the aluminum alkoxide compound used in the present invention will be given below, but the present invention is not limited thereto. Aluminum triethylate, aluminum triisopropylate, aluminum tri-sec-butylate, aluminum tris(ethylacetoacetate), ethylacetoacetate aluminum diisopropylate, aluminum monoacetylacetonate bis (ethylacetoacetate), aluminum tris(acetylacetonate), diisopropoxyaluminum-9-octadecenylacetoacetate, aluminum diisopropoxymonoethylacetoacetate, aluminum trisethylacetoacetate, aluminum trisacetylacetonate, mono-sec-butoxyaluminum diisopropylate, ethylacetoacetate aluminum diisopropylate, diethylacetoacetate aluminum isopropylate, aluminum bisethylacetoacetate monoacetylacetonate, aluminum octadecylacetoacetate diisopropylate Zirconium Alkoxide Compound As the zirconium alkoxide compound (preferably a zirconium coupling agent) used in the present invention, standard zirconium alkoxide compounds applicable in primer layers of constituent members of medical devices can be widely employed.

The zirconium alkoxide compound preferably includes at least one compound represented by general formula (e) or (f) below, more preferably includes at least one compound represented by general formula (e) below. The percentage of the total content of the compound represented by general formula (e) or (f) below in the zirconium alkoxide compound is not particularly limited, and can be, for example, 60 mass % or more, preferably 80 mass % or more, more preferably 90 mass % or more, still more preferably 95 mass % or more, and may be 100 mass %.

$$R^{1c}_{m3}-Zr-(OR^{2c})_{4-m3}$$ General formula (e):

$$O-[Zr-(OR^{2c})_3]_2$$ General formula (f):

$R^{1c}$ represents a hydrogen atom, an alkyl group, a cycloalkyl group, an acyl group, an aryl group, or an unsaturated aliphatic group.

The alkyl group, the cycloalkyl group, the acyl group, the aryl group, and the unsaturated aliphatic group may be, for example, an alkyl group, a cycloalkyl group, an acyl group, an aryl group, and an unsaturated aliphatic group, respectively, that can be employed as $R^{1b}$ in general formula (c) above.

$R^{2c}$ represents a hydrogen atom, an alkyl group, a cycloalkyl group, an acyl group, an alkenyl group, an aryl group, a phosphonate group, or $—SO_2R^{S3}$. $R^{S3}$ represents a substituent.

The alkyl group, the cycloalkyl group, the acyl group, the alkenyl group, the aryl group, and the phosphonate group may be, for example, an alkyl group, a cycloalkyl group, an acyl group, an alkenyl group, an aryl group, and a phosphonate group, respectively, that can be employed as $R^{2b}$ in general formula (c) above. The substituent that can be employed as $R^{S3}$ may be, for example, a substituent that can be employed as $R^{S2}$ in general formula (c) above.

m3 is an integer of 0 to 3.

In general formulae (e) and (f) above, at least one $OR^{2c}$ preferably has an acetonato structure. This acetonato structure has the same meaning as the acetonato structure described for general formula (c). Examples of forms in which $OR^{2c}$ has an acetonato structure include compounds ZR-1 and ZR-3 given later.

In general formula (e) above, at least one $OR^{2c}$ preferably has an acetato structure. This acetato structure has the same meaning as the acetato structure described for general formula (c). The form in which $OR^{2c}$ has an acetato structure is, for example, ZR-4 given later.

In general formulae (e) and (f) above, at least one $OR^{2c}$ preferably has a lactato structure. The lactato structure means a structure that has a lactate ion (lactate) as a basic structure with one hydrogen ion removed therefrom and that is coordinated to Zr. The phase "have a lactate ion as a basic structure" is meant to include the lactate ion and, in addition, a structure derived by replacing a hydrogen atom of the lactate ion with a substituent. The ligand atom coordinated to Zr is typically an oxygen atom. The form in which $OR^{2c}$ has a lactato structure is, for example, a compound ZR-2 given later.

Specific examples of the zirconium alkoxide compound used in the present invention will be given below, but the present invention is not limited thereto. Tetrapropoxyzirconium (also known as zirconium tetra-n-propoxide), tetrabutoxyzirconium (also known as zirconium tetra-n-butoxide), zirconium tetraacetylacetonate, zirconium tributoxymonoacetylacetonate, zirconium dibutoxybis(acetylacetonate), zirconium dibutoxybis(ethylacetoacetate), zirconium tributoxyethylacetoacetate, zirconium monobutoxyacetylacetonate bis(ethylacetoacetate), zirconium tributoxymonostearate (also known as zirconium tri-n-butoxide stearate), zirconium stearate, zirconium lactate ammonium salt, zirconium monoacetylacetonate The molecular weight of the silane coupling agent, the titanium alkoxide compound, the aluminum alkoxide compound, and the zirconium alkoxide compound used in the present invention is not particularly limited, and is, for example, preferably 100 to 2000, more preferably 200 to 500.

A polymer silane coupling agent can also be used.

The content of compounds having a reactive functional group, preferably a silane coupling agent and metal alkoxide compounds, in the primer layer is not particularly limited. Their total content is preferably 90 mass % or more, more preferably 95 mass % or more, still more preferably 97 mass % or more, particularly preferably 99 mass % or more, and can be 100 mass %.

For each of the silane coupling agent, the aluminum alkoxide compound, the zirconium alkoxide compound, and the titanium alkoxide compound contained in the primer layer, one compound or two or more compounds may be used.

The primer layer may contain, in addition to the silane coupling agent and the metal alkoxide compounds, additives such as a surfactant, a thickener, a leveling agent, a stabilizer, and an anti-foaming agent as long as the advantageous effects of the present invention are not impaired.

The primer layer may have a single-layer or multi-layer structure and preferably has a single-layer structure.

In the present invention, the phrase "the primer layer includes at least one of a silane coupling agent, a titanium alkoxide compound, an aluminum alkoxide compound, or a zirconium alkoxide compound" is meant to include a form in which at least one of the silane coupling agent, the titanium alkoxide compound, the aluminum alkoxide compound, or the zirconium alkoxide compound is included while being reacted with the siloxane compound-containing porous layer or the substrate and a form in which at least one of the silane coupling agent, the titanium alkoxide compound, the aluminum alkoxide compound, or the zirconium alkoxide compound is included while being reacted with the polymer coating layer. For example, the silane coupling agent, the titanium alkoxide compound, the aluminum alkoxide compound, and the zirconium alkoxide compound may each be present in a state where at least part thereof is hydrolyzed to expose a hydroxy group so that the hydroxy group reacts with a constituent metal of the siloxane compound-containing porous layer or the substrate or reacts with a group on the surface of the polymer coating layer.

The thickness of the primer layer is much smaller than those of standard adhesive layers, and is preferably, but not necessarily, 1 nm to 100 nm. That is, the primer layer is different from such an adhesive layer that requires a certain thickness and softness for adhesion between the substrate and the polymer coating layer.

Figure 2:
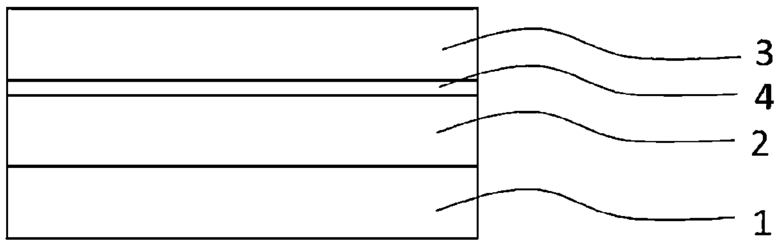
FIG. 2 is a longitudinal sectional view schematically showing a laminate according to another embodiment of the present invention different from FIG. 1.

For convenience of description, the primer layer is illustrated as a layer having a thickness in FIG. 2.

Examples of medical devices to which the laminate of the present invention can be applied, that is, the medical device of the present invention, include catheters, applicators, X-ray imaging devices, electrosurgical devices, assistive devices for treatment, ultrasound diagnostic apparatuses, and endoscopes.

Method for Producing Laminate

Formation of Siloxane Compound-Containing Porous Layer

A specific example of a method for forming a siloxane compound-containing porous layer will be described below, but the present invention is not limited thereto.

The siloxane compound-containing porous layer can be formed on at least one surface of a substrate through the following steps (i) and (ii).

(i) An alkoxysilane compound and at least one of a silane coupling agent, a titanium alkoxide compound, a zirconium alkoxide compound, or an aluminum alkoxide compound are allowed to undergo dehydration condensation reaction in the presence of a pore-forming agent to prepare a silica composition.

(ii) After the silica composition is applied onto a substrate, the silica composition is dried (or heated) to form a coating film, and the coating film is further heated at a high temperature to decompose and remove the pore-forming agent, thereby forming pores in the coating film.

In the step (i), in a mixed solution containing at least one of the alkoxysilane compound or the hydroxysilane compound described above, at least one of the silane coupling agent, the titanium alkoxide compound, the zirconium alkoxide compound, or the aluminum alkoxide compound described above, a pore-forming agent, and a solvent, the alkoxysilane compound and at least one of the silane coupling agent, the titanium alkoxide compound, the zirconium alkoxide compound, or the aluminum alkoxide compound are allowed to undergo dehydration condensation reaction to obtain a silica composition.

For example, the silica composition is obtained in a manner that the alkoxysilane compound, at least one of the silane coupling agent, the titanium alkoxide compound, the zirconium alkoxide compound, or the aluminum alkoxide compound, the pore-forming agent, and the solvent including water are mixed, a catalyst described below is added as necessary, the alkoxysilane compound is allowed to undergo dehydration condensation reaction in the presence of the pore-forming agent under stirring, and the resulting product is concentrated or diluted with a solvent as necessary. The dehydration condensation reaction may be carried out under usual reaction conditions (reaction temperature and reaction time).

The total silica content (the content of the dehydration condensation reaction product, that is, the siloxane compound) in the silica composition is preferably 0.05 mass % or more, more preferably 0.1 mass % or more, still more preferably 0.5 mass % or more, even more preferably 1 mass % or more. On the other hand, the total silica content is preferably 70 mass % or less, more preferably 50 mass % or less, still more preferably 40 mass % or less, even more preferably 20 mass % or less.

The pore-forming agent may be a substance that is included in silica and can be decomposed and removed by heating. The pore forming agent is, for example, a surfactant. The surfactant may be a nonionic surfactant, an anionic surfactant, a cationic surfactant, or an amphoteric surfactant, and is preferably a nonionic surfactant, more preferably a nonionic surfactant having a polymer structure. When the surfactant is a polymer, the number-average molecular weight thereof is, for example, 300 to 5000.

The content of the surfactant in the silica composition is preferably 0.1 mass % or more, more preferably 1 mass % or more, still more preferably 1.2 mass % or more, even more preferably 1.4 mass % or more. On the other hand, the content of the surfactant is preferably 50 mass % or less, more preferably 40 mass % or less, particularly preferably 30 mass % or less.

The solvent is preferably water or a combination of water and a water-soluble organic solvent. Examples of the water-soluble organic solvent include alcohol compounds such as monohydric alcohols having 1 to 4 carbon atoms, e.g., methanol, ethanol, 1-propanol, 2-propanol, 2-methyl-1-propanol, 1-butanol, 2-butanol, t-butanol, and 1-pentanol, dihydric alcohols having 1 to 4 carbon atoms, and polyhydric alcohols, e.g., glycerol and pentaerythritol; ethers or esters of the above alcohol compounds, e.g., methyl acetate, ethyl acetate, isobutyl acetate, diethylene glycol, ethylene glycol monomethyl ether, ethylene glycol dimethyl ether, 2-ethoxyethanol, propylene glycol monomethyl ether, and propylene glycol methyl ether acetate; ketone compounds such as acetone and methyl ethyl ketone; amide compounds such as formamide, N-methylformamide, N-ethylformamide, N,N-dimethylformamide, N,N-diethylformamide, N-methylacetamide, N-ethylacetamide, N,N-dimethylacetamide, N,N-diethylacetamide, N-methylpyrrolidone, N-formylmorpholine, N-acetylmorpholine, N-formylpiperidine, N-acetylpiperidine, N-formylpyrrolidine, N-acetylpyrrolidine, N,N'-diformylpiperazine, N,N'-diformylpiperazine, and N,N'-diacetylpiperazine; lactone compounds such as γ-butyrolactone; ureas such as tetramethylurea and N,N'-dimethylimidazolidine; and dimethyl sulfoxide. Of these, alcohols are preferred, and monohydric alcohols are more preferred, in order to hydrolyze the contained alkoxysilane compound under more stable conditions.

The silica composition typically contains a catalyst. The catalyst may be any substance that promotes the hydrolysis and dehydration condensation reaction of the alkoxysilane compound.

Examples thereof include acids such as hydrofluoric acid, phosphoric acid, boric acid, hydrochloric acid, nitric acid, sulfuric acid, formic acid, acetic acid, oxalic acid, maleic acid, methylmalonic acid, stearic acid, linoleic acid, benzoic acid, phthalic acid, citric acid, and succinic acid; amine compounds such as ammonia, butylamine, dibutylamine, and triethylamine; bases such as pyridine; and Lewis acids such as acetylacetone complexes of aluminum.

Examples of the catalyst also include metal chelate compounds. Examples of metal species of the metal chelate compounds include titanium, aluminum, zirconium, tin, and antimony.

The silica composition may contain a component other than the alkoxysilane compound, at least one of the silane coupling agent, the titanium alkoxide compound, the zirconium alkoxide compound, or the aluminum alkoxide compound, the organic solvent, the surfactant, water, and the catalyst described above as long as the advantageous effects of the present invention are not impaired.

In the step (ii), the substrate is immersed in the silica composition obtained in the step (i), and the substrate is then taken out and dried to form a coating film. Subsequently, the surfactant is decomposed and removed at a high temperature (e.g., 250° C. or higher), whereby a substrate having a siloxane compound-containing porous layer can be obtained.

The average pore size and the porosity of the siloxane compound-containing porous layer can be controlled by, for example, the types of raw materials, the blending ratio of the raw materials, and the reaction conditions (e.g., drying or heating temperature and heating time).

In the present invention, the substrate (a part of a surface of the substrate on the side where the siloxane compound-containing porous layer is formed) may have a part not covered with the siloxane compound-containing porous layer (i.e., the porous layer may have a void in a part thereof) as long as the advantageous effects of the present invention are not impaired.

Formation of Primer Layer

In the production of the laminate of the present invention, after the siloxane compound-containing porous layer is formed, a primer layer is preferably formed on the siloxane compound-containing porous layer. The primer layer can be formed by dissolving at least one of the silane coupling agent, the titanium alkoxide compound, the zirconium alkoxide compound, or the aluminum alkoxide compound described above in a solvent to prepare a coating liquid, applying or spraying the coating liquid to the siloxane compound-containing porous layer or immersing the substrate in the coating liquid to form a coating film on at least one surface of the substrate, and then drying the coating film by an ordinary method (e.g., drying at a high temperature of about 100° C.).

The solvent used for the coating liquid may be an alcohol solvent such as methanol or ethanol, a ketone solvent such as acetone or methyl ethyl ketone, an ester solvent such as ethyl acetate, a hydrocarbon solvent such as toluene, or a mixture thereof, and these solvents are preferably further mixed with water or an acid catalyst such as acetic acid in order to promote the hydrolysis of the silane coupling agent, the titanium alkoxide compound, the zirconium alkoxide compound, and the aluminum alkoxide compound. The coating liquid may be prepared to be acidic (e.g., pH 1 to 4 at 25° C.) or alkaline (e.g., pH 9 to 11 at 25° C.).

The content of the silane coupling agent, the titanium alkoxide compound, the zirconium alkoxide compound, and the aluminum alkoxide compound in the coating liquid is not particularly limited. For example, their total content can be 0.01 to 2 mass %, preferably 0.05% mass % or more and less than 1.5 mass %, more preferably 0.1 mass % or more and less than 1.0 mass %.

The coating liquid may include a surfactant, a catalyst, and the like in addition to at least one of the silane coupling agent, the titanium alkoxide compound, the zirconium alkoxide compound, or the aluminum alkoxide compound, the solvent, and a pH adjuster. The coating liquid is more preferably composed of at least one of the silane coupling agent, the titanium alkoxide compound, the zirconium alkoxide compound, or the aluminum alkoxide compound and the solvent.

In the present invention, the siloxane compound-containing layer may have a part not covered with the primer layer (i.e., the primer layer may have a defect in a part thereof) as long as the advantageous effects of the present invention are not impaired.

Formation of Polymer Coating Layer

The polymer coating layer can be formed, for example, through pressure bonding on the siloxane compound-containing porous layer or the primer layer under heating. For example, the polymer coating layer can be formed under the conditions of 5° C. to 30° C. higher than the melting temperature of the polymer and 1 to 100 MPa.

When the polymer coating layer is formed using a thermoplastic polymer for use, the polymer coating layer can be formed on the substrate by extrusion coating.

EXAMPLES

The present invention will now be described in more detail with reference to Examples, but these Examples should not be construed as limiting the present invention.

Production of Laminate

Figure 3:
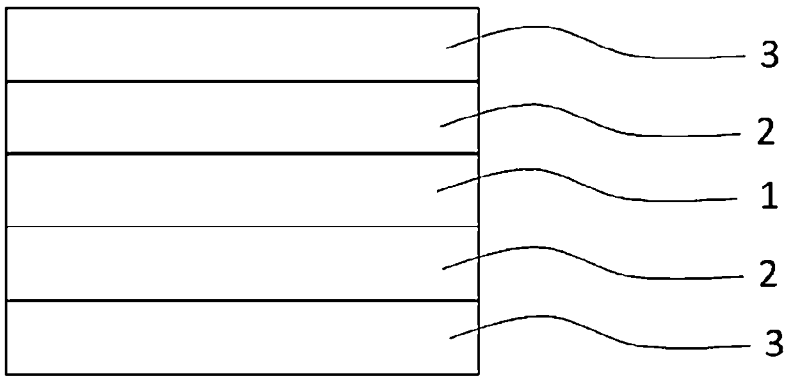
FIG. 3 is a longitudinal sectional view schematically showing a laminate according to another embodiment of the present invention different from FIGS. 1 and 2.
Figure 4:
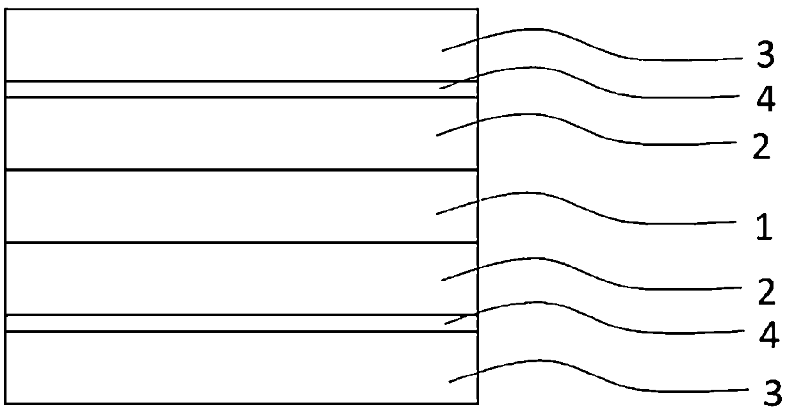
FIG. 4 is a longitudinal sectional view schematically showing a laminate according to another embodiment of the present invention different from FIGS. 1 to 3.

A laminate having a structure shown in FIG. 3 or 4 was produced.

Substrate

Stainless Steel (SUS304) Substrate

A stainless steel (SUS304) metal plate 80 mm long, 20 mm wide, and 2 mm thick, on surfaces of which passivation layers were formed by annealing treatment (heating treatment), was used. This metal plate was degreased with acetone and then washed by immersion in a 1 N aqueous sodium hydroxide solution at 50° C. for 3 minutes. Subsequently, the metal plate was rinsed with distilled water three times and then dried in an oven heated to 100° C. for 10 minutes to prepare a substrate.

Substrates other than Stainless Steel Substrate

The size of substrates other than the stainless steel substrate shown in Table 3 is 80 mm long, 20 mm wide, and 2 mm thick.

The glass substrate was JIS R3503 (trade name) silica glass manufactured by Standard Testpiece Co., Ltd., which was pretreated in the same manner as the stainless steel substrate.

The ceramic substrate was stabilized zirconia "PSZ200" (trade name) manufactured by AS ONE Corporation.

The ABS resin substrate was a sheet obtained through injection molding of "130" (trade name) manufactured by Techno-UMG Co., Ltd., the surfaces of which were cleaned with ethanol.

The epoxy resin substrate was an epoxy resin sheet manufactured by Standard Testpiece Co., Ltd., the surfaces of which were cleaned with ethanol.

Preparation of Substrate having Siloxane Compound-Containing Porous Layer (L-1) having Reactive Functional Group Forty grams (190 mmol) of tetraethoxysilane, 1.0 g (2.8 mmol) of isopropyl tri(N-aminoethyl-aminoethyl) titanate ("PLENACT 44" (trade name) manufactured by Ajinomoto Fine-Techno Co., Inc., TI-1 in Table 3 below), 9 g of ethanol, 14 g of water, and 33 g of a 0.3 mass % aqueous hydrochloric acid solution were mixed, stirred for 30 minutes in a water bath at 63° C., and then further stirred for 30 minutes at room temperature to prepare a mixture (A).

The mixture (A) was mixed with 15 g of a nonionic surfactant (polyethylene oxide-polypropylene oxide-polyethylene oxide triblock polymer, "PLURONIC (registered trademark) L-31" (trade name) manufactured by BASF, number-average molecular weight (Mn): 1,100) and 12 g of ethanol, and the resulting mixture was stirred at room temperature for 60 minutes to prepare a mixture (B).

The mixture (B) was 25-fold diluted with 1-butanol and filtered through a filter with 0.45 μm openings to obtain a silica composition (C) (solid content: 1.0%).

The washed stainless steel substrate described above was immersed in the silica composition (C) for 5 minutes, and then pulled up and air-dried at 40° C. for 30 minutes. This substrate was heated in an oven at 300° C. for 5 hours to thermally decompose and remove the nonionic surfactant, thereby preparing a substrate having a siloxane compound-containing porous layer (L-1) having a reactive functional group (amino group). The reactive functional group in the porous layer is derived from the raw material used for the synthesis of the siloxane compound and meant to include a reactive functional group that exists in a free state as a result of hydrolysis.

Preparation of Substrates having Siloxane Compound-Containing Porous Layers (L-2) to (L-5) having Reactive Functional Group Substrates having siloxane compound-containing porous layers (L-2) to (L-5) having a reactive functional group were prepared in the same manner as the substrate having a siloxane compound-containing porous layer (L-1) having a reactive functional group, except that the nonionic surfactant (PLURONIC L-31) was replaced with nonionic surfactants shown in Table 1 below.

Preparation of Substrates having Siloxane Compound-Containing Porous Layers (L-6) to (L-12) having Reactive Functional Group Substrates having siloxane compound-containing porous layers (L-6) to (L-12) having a reactive functional group were prepared in the same manner as the substrate having a siloxane compound-containing porous layer (L-1) having a reactive functional group, except that tetraethoxysilane and compounds shown in the row of "Alkoxide" in Table 3 below were used.

The tetraethoxysilane and the compounds shown in the row of "Alkoxide" in Table 3 were used in the same molar amounts as in the preparation of the substrate having a siloxane compound-containing porous layer (L-1) having a reactive functional group.

Preparation of Substrate having Siloxane Compound-Containing Layer (R-1) having No Reactive Functional Groups A substrate having a siloxane compound-containing layer (R-1) having no reactive functional groups in the starting compound was prepared in the same manner as the substrate having a siloxane compound-containing porous layer (L-1) having a reactive functional group, except that TI-1 was not used.

The siloxane compound-containing layer (R-1) having no reactive functional groups in the starting compound had an average pore size of 1.1 μm, a porosity of 15%, and an average thickness of 280 nm.

Preparation of Substrate having Siloxane Compound-Containing Layer (R-2) having No Pores A substrate having a siloxane compound-containing layer (R-2) having no pores was prepared in the same manner as the substrate having a siloxane compound-containing porous layer (L-1) having a reactive functional group, except that no nonionic surfactants were used. In the siloxane compound-containing layer (R-2) having no pores, no pores were observed.

The siloxane compound-containing layer (R-2) having no pores had an average thickness of 240 nm.

The average pore size, porosity, and average thickness of the siloxane compound-containing porous layers were determined by making measurements in the following manner. The measurement results are shown in Table 1 given below.

Average Pore Size and Porosity

The substrates having the siloxane compound-containing porous layers were placed in an oven set to 150° *C. for* 4 hours, then allowed to stand in a desiccator until the temperature reached room temperature, and used for the measurement.

The measurement was made by mercury intrusion porosimetry using a porosimeter ("PoreSizer 9320" (trade name) manufactured by Micromeritics Instrument Corp.). The measurement conditions were as follows: initial pressure, 20 kPa; measured pore size, 3 nm to 400 μm; measurement mode, pressurization (intrusion) process; measured cell volume, about 6 $cm^3$; mercury contact angle, 130°; mercury surface tension, 484 dyn/cm.

Average Thickness

The average thickness of the siloxane compound-containing porous layers was determined in the following manner.

The laminate produced above was randomly cut at five positions, and each siloxane compound-containing porous layer section was observed with a scanning electron microscope (S-5500 (trade name), manufactured by Hitachi High-Technologies Corporation) at a magnification of 50,000×. The thickness of each section of the siloxane compound-containing porous layer formed on one side of the substrate (one of the two siloxane compound-containing porous layers formed) was measured. The five thicknesses obtained were averaged to determine the average thickness.

TABLE 1

| | Siloxane compound-containing porous layer | | | | |
|---|---|---|---|---|---|
| | (L-1) | (L-2) | (L-3) | (L-4) | (L-5) |
| Nonionic surfactant | L-31 | L-64 | L-121 | P-123 | F-108 |
| Number-average molecular weight Mn | 1,100 | 2,900 | 4,400 | 5,800 | 14,600 |
| Average pore size | 80 nm | 200 nm | 1.2 μm | 5.3 μm | 18 μm |
| Porosity (%) | 14 | 23 | 33 | 42 | 47 |
| Average thickness (μm) | 0.26 | 0.57 | 3.3 | 16 | 62 |

Notes of Table 1

Siloxane compound-containing porous layer: a siloxane compound-containing porous layer having a reactive functional group L-31: PLURONIC L-31 (trade name, manufactured by BASF)

L-64: PLURONIC L-64 (trade name, manufactured by BASF)

L-121: PLURONIC L-121 (trade name, manufactured by BASF)

L-123: PLURONIC L-123 (trade name, manufactured by BASF)

F-108: PLURONIC F-108 (trade name, manufactured by BASF)

Number-average molecular weight Mn: the number-average molecular weight of a nonionic surfactant

TABLE 2

| | Siloxane compound-containing porous layer | | | | | | |
|---|---|---|---|---|---|---|---|
| | (L-6) | (L-7) | (L-8) | (L-9) | (L-10) | (L-11) | (L-12) |
| Average pore size | 1.4 μm | 1.5 μm | 1.3 μm | 1.6 μm | 1.3 μm | 2.3 μm | 2.1 μm |
| Porosity (%) | 34 | 35 | 32 | 37 | 31 | 39 | 37 |
| Average thickness (μm) | 3.5 | 3.7 | 3.3 | 3.5 | 3.3 | 4.6 | 4.1 |

Formation of Primer Layer (Example 13)

At room temperature, 150 g of ethanol, 350 g of water, and 1.0 g of isopropyl tri(N-aminoethyl-aminoethyl) titanate ("PLENACT 44" (trade name) manufactured by Ajinomoto Fine-Techno Co., Inc., TI-1 in Table 3 below) were mixed to prepare a coating liquid for primer layer formation.

The substrate having the siloxane compound-containing porous layer (L-3) having a reactive functional group was immersed in the coating liquid for primer layer formation for 1 minute, pulled up into the air, air-dried for 10 minutes, and then placed in an oven at 150° C. and dried by heating for 10 minutes. In this manner, a substrate having a siloxane compound-containing porous layer and a primer layer in this order was produced.

In the same manner, substrates each having a siloxane compound-containing porous layer and a primer layer shown in Table 3 in this order were produced.

Formation of Polymer Coating Layer (Examples 1 to 40 and 42 to 60)

To a siloxane compound-containing porous layer or a primer layer, a polymer sheet as shown in Table 3 (Tables 3-1 to 3-4) below, which had been cut to be 60 mm long, 10 mm wide, and 0.4 mm thick in advance, was pressure-bonded by hot pressing (forming temperature: polymer melting temperature +10° C., pressurize at 10 MPa for 20 seconds) to produce a laminate having a polymer coating layer.

Formation of Polymer Coating Layer (Example 41)

A bisphenol A epoxy resin ("jER828" (trade name) manufactured by Mitsubishi Chemical Corporation, epoxy equivalent: 184 to 194 g/eq.) in an amount of 6.0 g and a polyamideamine ("SUNMIDE305" manufactured by Evonik Industries) in an amount of 4.0 g were mixed well to obtain an epoxy resin mixture.

The epoxy resin mixture was applied onto the primer layer so as to be 0.4 mm thick, and cured at room temperature for 1 hour and at 80° C. for 2 hours to produce a laminate having a polymer coating layer formed of an epoxy resin (M-1).

The laminates produced were subjected to the following tests. The results are listed in Table 3 below.

Test Example 1: Evaluation of Ethylene Oxide Gas (EOG)) Sterilization Resistance The laminates produced above were each repeatedly subjected to sterilization treatment under the following conditions using EOG sterilization equipment ("Model EQ-150" (trade name) manufactured by Miura Co., Ltd.).

Sterilization Conditions

Ethylene oxide gas:carbon dioxide =20:80
55° C.
50% RH (relative humidity)
Pressure reduction: 71 kPa
Pressure application: 69 kPa
Gas concentration: 450 mg/L
Pretreatment: 1 hour
Sterilization treatment: 5 hours
Ventilation (at 55° C.) after sterilization: 12 hours The number of times the sterilization treatment was performed until peeling or lifting of the siloxane compound-containing porous layer from the substrate or peeling or lifting of the polymer coating layer from the siloxane compound-containing porous layer occurred was evaluated according to the following evaluation criteria. In this test, "C" or higher is acceptable.

Evaluation Criteria of EOG Sterilization Resistance

AA: 200 or more
A: 100 or more and less than 200
B: 50 or more and less than 100
C: 20 or more and less than 50
D: less than 20

Test Example 2: Evaluation of Hydrogen Peroxide Gas Sterilization Resistance

The laminates produced above were each repeatedly subjected to low-temperature plasma sterilization treatment on the advanced course of a hydrogen peroxide gas sterilizer ("STERRAD (registered trademark) NX" manufactured by ASP Inc.). The number of times the treatment was performed until peeling or lifting of the siloxane compound-containing porous layer from the substrate or peeling or lifting of the polymer coating layer from the siloxane compound-containing porous layer occurred was evaluated according to the following evaluation criteria. In this test, "C" or higher is acceptable.

Evaluation Criteria

AA: 200 or more
A: 100 or more and less than 200
B: 50 or more and less than 100
C: 20 or more and less than 50
D: less than 20

TABLE 3-1

| | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Substrate | | SUS304 | SUS304 | SUS304 | SUS304 | SUS304 | SUS304 | SUS304 | SUS304 | SUS304 | SUS304 |
| Siloxane compound-containing porous layer | Type | (L-1) | (L-2) | (L-3) | (L-4) | (L-5) | (L-6) | (L-7) | (L-8) | (L-9) | (L-10) |
| | Alkoxide | (TI-1) | (TI-1) | (TI-1) | (TI-1) | (TI-1) | (TI-2) | (TI-3) | (AL-1) | (ZR-1) | (SI-1) |
| | Reactive functional group | amino | amino | amino | amino | amino | phosphate | pyrophosphate | acyl | acyl | amino |
| | Average pore size | 80 nm | 200 nm | 1.2 μm | 5.3 μm | 18 μm | 1.4 μm | 1.5 μm | 1.3 μm | 1.6 μm | 1.3 μm |
| Primer layer | Type | — | — | — | — | — | — | — | — | — | — |
| | Reactive functional group | | | | | | | | | | |
| Polymer coating layer | | (A-1) | (A-1) | (A-1) | (A-1) | (A-1) | (A-1) | (A-1) | (A-1) | (A-1) | (A-1) |
| EOG sterilization resistance | | B | A | A | B | C | A | A | B | B | A |
| $H_2O_2$ gas sterilization resistance | | C | B | A | A | B | A | A | C | C | A |

| | | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|
| Substrate | | SUS304 | SUS304 | SUS304 | SUS304 | SUS304 | SUS304 | SUS304 | SUS304 | SUS304 | SUS304 |
| Siloxane compound-containing porous layer | Type | (L-11) | (L-12) | (L-3) | (L-3) | (L-3) | (L-3) | (L-3) | (L-3) | (L-3) | (L-3) |
| | Alkoxide | (SI-4) | (SI-6) | (TI-1) | (TI-1) | (TI-1) | (TI-1) | (TI-1) | (TI-1) | (TI-1) | (TI-1) |
| | Reactive functional group | methacrylic | mercapto | amino | amino | amino | amino | amino | amino | amino | amino |
| | Average pore size | 2.3 μm | 2.1 μm | 1.2 μm | 1.2 μm | 1.2 μm | 1.2 μm | 1.2 μm | 1.2 μm | 1.2 μm | 1.2 μm |
| Primer layer | Type | — | — | (TI-1) | (TI-2) | (TI-3) | (TI-4) | (TI-5) | (TI-6) | (TI-7) | (TI-8) |
| | Reactive functional group | | | amino hydroxy | hydroxy phosphate | pyrophosphate hydroxy | pyrophosphate hydroxy carboxy | pyrophosphate hydroxy carboxy | sulfonyl hydroxy | hydroxy | acyl hydroxy |

TABLE 3-1-continued

| | | | | | | | | | | |
|---|---|---|---|---|---|---|---|---|---|---|
| Polymer coating layer | (A-1) | (A-1) | (A-1) | (A-1) | (A-1) | (A-1) | (A-1) | (A-1) | (A-1) | (A-1) |
| EOG sterilization resistance | A | B | AA | AA | AA | AA | AA | AA | A | A |
| $H_2O_2$ gas sterilization resistance | B | A | AA | AA | AA | AA | AA | A | A | A |

TABLE 3-2

| | | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|---|
| Substrate | | SUS304 | SUS304 | SUS304 | SUS304 | SUS304 | SUS304 | SUS304 | SUS304 | SUS304 | SUS304 |
| Siloxane compound-containing porous layer | Type | (L-3) | (L-3) | (L-3) | (L-3) | (L-3) | (L-3) | (L-3) | (L-3) | (L-3) | (L-3) |
| | Alkoxide | (TI-1) | (TI-1) | (TI-1) | (TI-1) | (TI-1) | (TI-1) | (TI-1) | (TI-1) | (TI-1) | (TI-1) |
| | Reactive functional group | amino | amino | amino | amino | amino | amino | amino | amino | amino | amino |
| | Average pore size | 1.2 μm | 1.2 μm | 1.2 μm | 1.2 μm | 1.2 μm | 1.2 μm | 1.2 μm | 1.2 μm | 1.2 μm | 1.2 μm |
| Primer layer | Type | (TI-9) | (TI-10) | (AL-1) | (AL-2) | (AL-3) | (AL-4) | (AL-5) | (ZR-1) | (ZR-2) | (ZR-3) |
| | Reactive functional group | hydroxy | hydroxy | acyl hydroxy | acyl hydroxy | acyl hydroxy | acyl hydroxy | hydroxy | acyl hydroxy | carboxy hydroxy | acyl hydroxy |
| Polymer coating layer | | (A-1) | (A-1) | (A-1) | (A-1) | (A-1) | (A-1) | (A-1) | (A-1) | (A-1) | (A-1) |
| EOG sterilization resistance | | A | A | A | A | B | B | B | A | A | A |
| $H_2O_2$ gas sterilization resistance | | A | A | B | B | A | A | B | B | B | B |
| | | Ex. 31 | Ex. 32 | Ex. 33 | Ex. 34 | Ex. 35 | Ex. 36 | Ex. 37 | Ex. 38 | Ex. 39 | Ex. 40 |
| Substrate | | SUS304 | SUS304 | SUS304 | SUS304 | SUS304 | SUS304 | SUS304 | SUS304 | SUS304 | SUS304 |
| Siloxane compound-containing porous layer | Type | (L-3) | (L-3) | (L-3) | (L-3) | (L-3) | (L-3) | (L-3) | (L-3) | (L-3) | (L-3) |
| | Alkoxide | (TI-1) | (TI-1) | (TI-1) | (TI-1) | (TI-1) | (TI-1) | (TI-1) | (TI-1) | (TI-1) | (TI-1) |
| | Reactive functional group | amino | amino | amino | amino | amino | amino | amino | amino | amino | amino |
| | Average pore size | 1.2 μm | 1.2 μm | 1.2 μm | 1.2 μm | 1.2 μm | 1.2 μm | 1.2 μm | 1.2 μm | 1.2 μm | 1.2 μm |
| Primer layer | Type | (ZR-4) | (ZR-5) | (SI-1) | (SI-2) | (SI-3) | (SI-4) | (SI-5) | (SI-6) | (TI-1) | (TI-1) |
| | Reactive functional group | acyl hydroxy | hydroxy | amino hydroxy | amino hydroxy | acid anhydride hydroxy | methacrylic hydroxy | epoxy hydroxy | mercapto hydroxy | amino hydroxy | amino hydroxy |
| Polymer coating layer | | (A-1) | (A-1) | (A-1) | (A-1) | (A-1) | (A-1) | (A-1) | (A-1) | (E-1) | (F-1) |
| EOG sterilization resistance | | A | B | B | B | B | B | B | A | AA | AA |
| $H_2O_2$ gas sterilization resistance | | B | B | A | A | C | B | C | B | AA | AA |

TABLE 3-3

| | | Ex. 41 | Ex. 42 | Ex. 43 | Ex. 44 | Ex. 45 | Ex. 46 | Ex. 47 | Ex. 48 | Ex. 49 | Ex. 50 |
|---|---|---|---|---|---|---|---|---|---|---|---|
| Substrate | | SUS304 | SUS304 | SUS304 | SUS304 | SUS304 | SUS304 | Al | Ti | Mg | Ni |
| Siloxane compound-containing porous layer | Type | (L-3) | (L-3) | (L-3) | (L-3) | (L-3) | (L-3) | (L-3) | (L-3) | (L-3) | (L-3) |
| | Alkoxide | (TI-1) | (TI-1) | (TI-1) | (TI-1) | (TI-1) | (TI-1) | (TI-1) | (TI-1) | (TI-1) | (TI-1) |
| | Reactive functional group | amino | amino | amino | amino | amino | amino | amino | amino | amino | amino |
| | Average pore size | 1.2 μm | 1.2 μm | 1.2 μm | 1.2 μm | 1.2 μm | 1.2 μm | 1.2 μm | 1.2 μm | 1.2 μm | 1.2 μm |
| Primer layer | Type | (TI-1) | (TI-1) | (TI-1) | (TI-1) | (TI-1) | (TI-1) | (TI-1) | (TI-1) | (TI-1) | (TI-1) |
| | Reactive functional group | amino hydroxy | amino hydroxy | amino hydroxy | amino hydroxy | amino hydroxy | amino hydroxy | amino hydroxy | amino hydroxy | amino hydroxy | hydroxy amino |
| Polymer coating layer | | (M-1) | (P-1) | (P-2) | (P-3) | (P-4) | (U-1) | (A-1) | (A-1) | (A-1) | (A-1) |
| EOG sterilization resistance | | B | AA | AA | AA | AA | A | AA | AA | A | AA |
| $H_2O_2$ gas sterilization resistance | | A | AA | A | A | A | AA | A | AA | A | AA |

TABLE 3-3-continued

| | | Ex. 51 | Ex. 52 | Ex. 53 | Ex. 54 | Ex. 55 | Ex. 56 | Ex. 57 | Ex. 58 | Ex. 59 | Ex. 60 |
|---|---|---|---|---|---|---|---|---|---|---|---|
| Substrate | | Cu | Zn | Sn | Cr | W | Co | glass | ceramic | ABS resin | epoxy resin |
| Siloxane compound-containing porous layer | Type | (L-3) | (L-3) | (L-3) | (L-3) | (L-3) | (L-3) | (L-3) | (L-3) | (L-3) | (L-3) |
| | Alkoxide | (TI-1) | (TI-1) | (TI-1) | (TI-1) | (TI-1) | (TI-1) | (TI-1) | (TI-1) | (TI-1) | (TI-1) |
| | Reactive functional group | amino | amino | amino | amino | amino | amino | amino | amino | amino | amino |
| | Average pore size | 1.2 μm | 1.2 μm | 1.2 μm | 1.2 μm | 1.2 μm | 1.2 μm | 1.2 μm | 1.2 μm | 1.2 μm | 1.2 μm |
| Primer layer | Type | (TI-1) | (TI-1) | (TI-1) | (TI-1) | (TI-1) | (TI-1) | (TI-1) | (TI-1) | (TI-1) | (TI-1) |
| | Reactive functional group | amino hydroxy | amino hydroxy | amino hydroxy | amino hydroxy | amino hydroxy | amino hydroxy | amino hydroxy | amino hydroxy | amino hydroxy | amino hydroxy |
| Polymer coating layer | | (A-1) | (A-1) | (A-1) | (A-1) | (A-1) | (A-1) | (A-1) | (A-1) | (A-1) | (A-1) |
| EOG sterilization resistance | | AA | AA | AA | AA | AA | AA | AA | AA | A | A |
| $H_2O_2$ gas sterilization resistance | | A | AA | AA | AA | AA | AA | AA | AA | AA | A |

TABLE 3-4

| | | CE. 1 | CE. 2 | CE. 3 | CE. 4 | CE. 5 | CE. 6 | CE. 7 | CE. 8 | CE. 9 | CE. 10 |
|---|---|---|---|---|---|---|---|---|---|---|---|
| Substrate | | SUS304 | SUS304 | SUS304 | SUS304 | SUS304 | SUS304 | SUS304 | SUS304 | SUS304 | SUS304 |
| Siloxane compound-containing porous layer | Type | — | — | (R-1) | (R-1) | (R-2) | (R-1) | (R-1) | (R-1) | (R-2) | (R-2) |
| | Alkoxide | | | TES | TES | (TI-1) | TES | TES | TES | (TI-1) | (TI-1) |
| | Reactive functional group | | | — | — | amino | — | — | — | amino | amino |
| | Average pore size | | | 1.1 μm | 1.1 μm | *1 | 1.1 μm | 1.1 μm | 1.1 μm | *1 | *1 |
| Primer layer | Type | | (TI-1) | — | (TI-1) | (TI-1) | (AL-1) | (ZR-1) | (SI-1) | (AL-1) | (ZR-1) |
| | Reactive functional group | | amino hydroxy | | amino hydroxy | amino hydroxy | acyl hydroxy | acyl hydroxy | amino hydroxy | acyl hydroxy | acyl hydroxy |
| Polymer coating layer | | (A-1) | (A-1) | (A-1) | (A-1) | (A-1) | (A-1) | (A-1) | (A-1) | (A-1) | (A-1) |
| EOG sterilization resistance | | D | D | D | C | D | D | D | D | D | D |
| $H_2O_2$ gas sterilization resistance | | D | C | D | D | D | D | D | D | D | D |

| | | CE. 11 |
|---|---|---|
| Substrate | | SUS304 |
| Siloxane compound-containing porous layer | Type | (R-2) |
| | Alkoxide | (TI-1) |
| | Reactive functional group | amino |
| | Average pore size | *1 |
| Primer layer | Type | (SI-1) |
| | Reactive functional group | amino hydroxy |
| Polymer coating layer | | (A-1) |
| EOG sterilization resistance | | D |
| $H_2O_2$ gas sterilization resistance | | D |

*1 No pores are observed.

Notes of Table 3

Ex: Example

CE: Comparative Example

In "Reactive functional group" of "Siloxane compound-containing porous layer", reactive functional groups of starting compounds are shown. In "Reactive functional group" of "Primer layer", reactive functional groups of silane coupling agents, titanium alkoxide compounds, aluminum alkoxide compounds, and zirconium alkoxide compounds, hydroxy groups formed as a result of partial hydrolysis of hydrolyzable groups, and the like are shown.

The abbreviations listed in the above tables are as follows.

(A-1):

Polyamide elastomer (trade name: PEBAX 4533, manufactured by Arkema Inc.)

(E-1):

Polyester elastomer (trade name: PELPRENE P-40B, manufactured by Toyobo Co., Ltd.)

(F-1):

Fluorine-containing elastomer (trade name: DAI-EL T-530, manufactured by Daikin Industries, Ltd.)

(P-1):

Polyolefin elastomer (trade name: Zelas MC707, manufactured by Mitsubishi Chemical Corporation)

(P-2):

Polypropylene resin (trade name: NOVATEC PP MA3, manufactured by Japan Polyethylene Corporation)

(P-3):

Polymethylpentene resin (trade name: TPX DX231, manufactured by Mitsui Chemicals, Inc.)

(P-4):

Acrylonitrile-styrene copolymer resin (copolymerization ratio by mass: acrylonitrile:styrene =30:70, trade name: STYLAC AS767, manufactured by Asahi Kasei Chemicals Corporation)

(U-1):

Polyurethane elastomer (trade name: PANDEX T-8185, manufactured by DIC Corporation)

Titanium Alkoxide Compound (TI-1):

Isopropyl tri(N-aminoethyl-aminoethyl) titanate ("PLENACT 44" manufactured by Ajinomoto Fine-Techno Co., Inc.)

TI-1

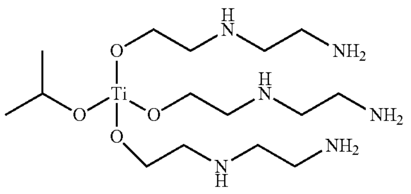

(TI-2):

Dioctyl bis(ditridecyl)phosphate titanate (trade name: PLENACT 46B, manufactured by Ajinomoto Fine-Techno Co., Inc.)

TI-2

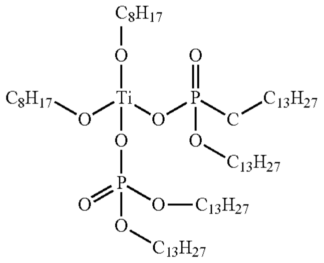

(TI-3):

Diisopropyl bis(dioctylpyrophosphate) titanate (trade name: PLENACT 38S, manufactured by Ajinomoto Fine-Techno Co., Inc.)

TI-3

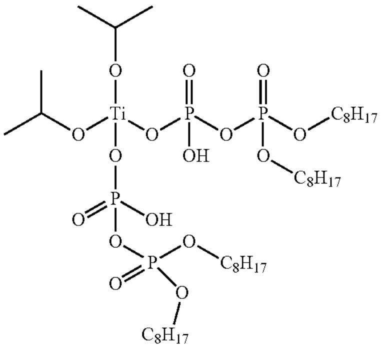

(TI-4):

Bis(dioctylpyrophosphate)oxyacetate titanate ("PLENACT 138S" manufactured by Ajinomoto Fine-Techno Co., Inc.)

TI-4

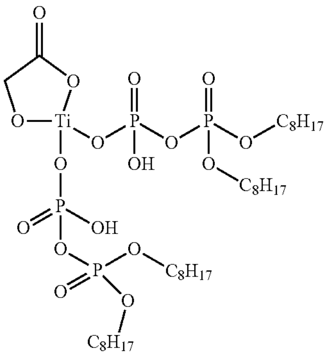

Bis(dioctylpyrophosphate)ethylene titanate ("PLENACT 238S" manufactured by Ajinomoto Fine-Techno Co., Inc.)

TI-5

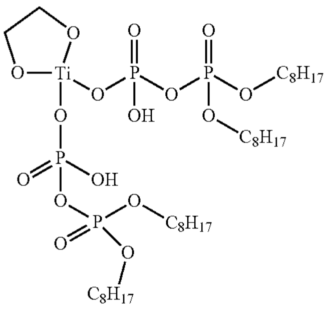

(TI-6):

Isopropyl tridodecylbenzenesulfonyl titanate ("PLENACT 9SA" manufactured by Ajinomoto Fine-Techno Co., Inc.)

TI-6

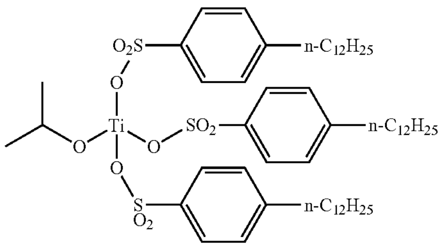

(TI-7):

Titanium di-2-ethylhexoxy bis(2-ethyl-3-hydroxyhexoxide) ("ORGATIX TC-201" manufactured by Matsumoto Fine Chemical Co., Ltd.)

TI-7

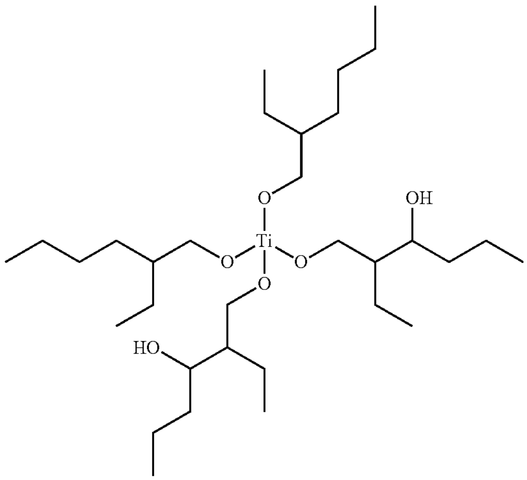

(TI-8):

Isopropyl triisostearoyl titanate (trade name: PLENACT TTS, manufactured by Ajinomoto Fine-Techno Co., Inc.)

TI-8

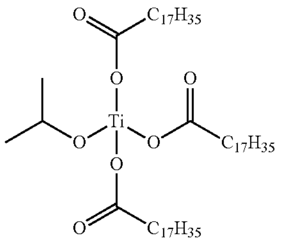

(TI-9):

Tetra n-butyl titanate (trade name: ORGATIX TA-21, manufactured by Matsumoto Fine Chemical Co., Ltd.)

TI-9

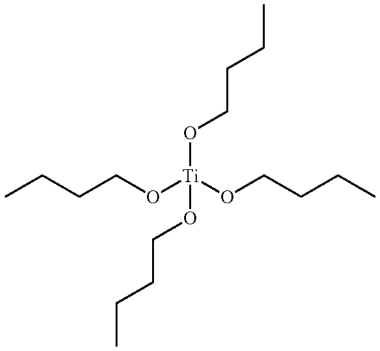

(TI-10):

n-Butyl titanate dimer (trade name: ORGATIX TA-23, manufactured by Matsumoto Fine Chemical Co., Ltd.)

TI-10

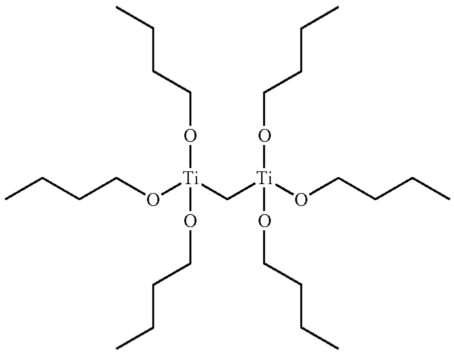

Aluminum Alkoxide Compound (AL-1):

Aluminum trisacetylacetonate (trade name: ORGATIX AL-3100, manufactured by Matsumoto Fine Chemical Co., Ltd.)

AL-1

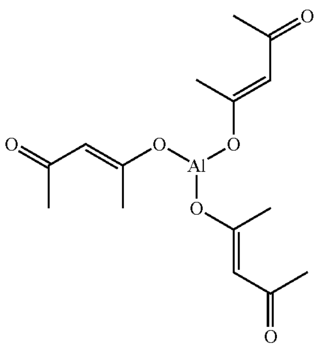

(AL-2):

Aluminum bisethylacetoacetate monoacetylacetonate (trade name: ORGATIX AL 3200, manufactured by Matsumoto Fine Chemical Co., Ltd.)

AL-2

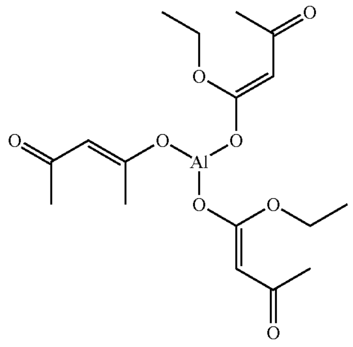

(AL-3):

Aluminum trisethylacetoacetate (trade name: ORGATIX AL-3215, manufactured by Matsumoto Fine Chemical Co., Ltd.)

AL-3

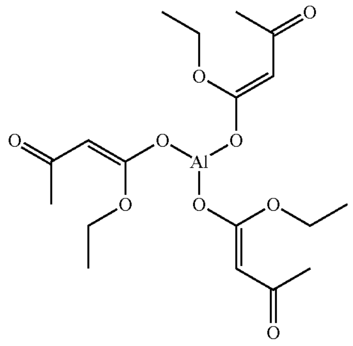

(AL-4):

Aluminum octadecylacetoacetate diisopropylate (trade name: PLENACT AL-M, manufactured by Ajinomoto Fine-Techno Co., Inc.)

AL-4

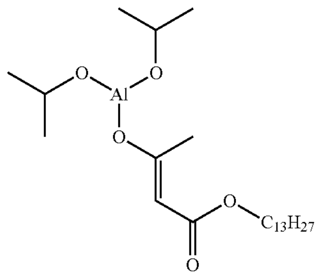

(AL-5):

Aluminum sec-butoxide (trade name: ASBD, manufactured by Kawaken Fine Chemicals Co., Ltd.)

AL-5

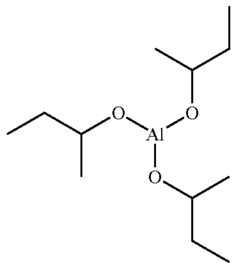

Zirconium Alkoxide Compound (ZR-1):

Zirconium tetraacetylacetonate (trade name: ORGATIX ZC-150, manufactured by Matsumoto Fine Chemical Co., Ltd.)

ZR-1

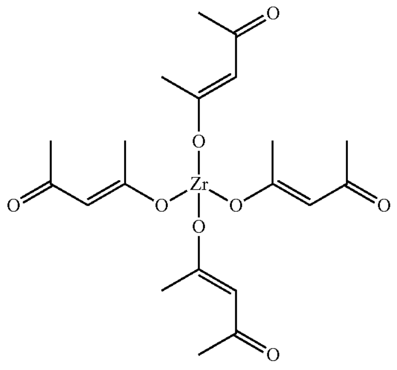

(ZR-2):

Zirconium lactate ammonium salt (trade name: ORGATIX ZC-300, manufactured by Matsumoto Fine Chemical Co., Ltd.)

ZR-2

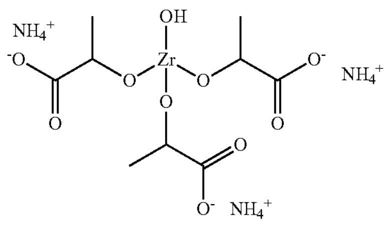

(ZR-3):

Zirconium tri-n-butoxymonoacetylacetonate ("ORGATIX ZC-540" manufactured by Matsumoto Fine Chemical Co., Ltd.)

ZR-3

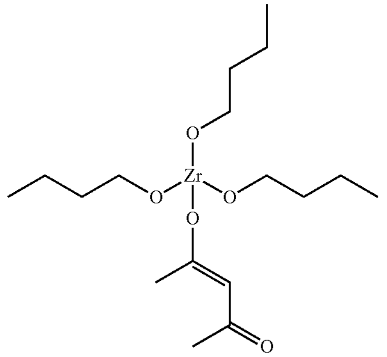

(ZR-4):

Zirconium di-n-butoxybis(ethylacetoacetate) ("ORGATIX ZC-580" manufactured by Matsumoto Fine Chemical Co., Ltd.)

ZR-4

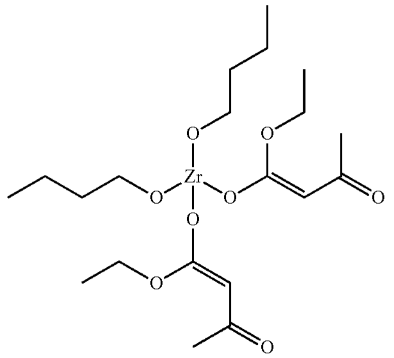

(ZR-5):

Zirconium tetra-n-butoxide (trade name: ORGATIX ZA-65, manufactured by Matsumoto Fine Chemical Co., Ltd.)

ZR-5

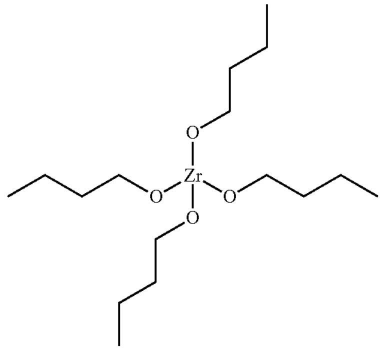

Silane Coupling Agent (SI-1):

N-2-(Aminoethyl)-3-aminopropylmethyldimethoxysilane (trade name: KBM-603, manufactured by Shin-Etsu Chemical Co., Ltd.)

(SI-2):

3-Aminopropyltrimethoxysilane (trade name: KBM-903, manufactured by Shin-Etsu Chemical Co., Ltd.)

(SI-3):

3-Trimethoxysilylpropylsuccinic anhydride (trade name: X-12-967C, manufactured by Shin-Etsu Chemical Co., Ltd.)

(SI-4):

(3-Methacryloxypropyl)trimethoxysilane (trade name: KBM-503, manufactured by Shin-Etsu Chemical Co., Ltd.)

(SI-5):

3-Glycidoxypropyltrimethoxysilane (trade name: KBM-403, manufactured by Shin-Etsu Chemical Co., Ltd.)

(SI-6):

3-Mercaptopropyltrimethoxysilane (trade name: KBM-803, manufactured by Shin-Etsu Chemical Co., Ltd.)

TES: Tetraethoxysilane

Table 3 shows the following.

The laminate of Comparative Example 1 does not have a siloxane compound-containing porous layer or a primer layer specified in the present invention. The laminate of Comparative Example 1 has low ethylene oxide gas sterilization resistance and low hydrogen peroxide gas sterilization resistance.

The laminate of Comparative Example 2 does not have a siloxane compound-containing porous layer specified in the present invention. The laminate of Comparative Example 2 has low ethylene oxide gas sterilization resistance.

The laminate of Comparative Example 3 has a siloxane compound-containing layer on the substrate, but the siloxane compound included in this layer does not have a reactive functional group. The laminate of Comparative Example 3 does not have a primer layer specified in the present invention. The laminate of Comparative Example 3 has low ethylene oxide gas sterilization resistance and low hydrogen peroxide gas sterilization resistance.

The laminate of Comparative Example 4 has a siloxane compound-containing layer on the substrate, but the siloxane compound included in this layer does not have a reactive functional group. The laminate of Comparative Example 4 has a primer layer specified in the present invention but has low hydrogen peroxide gas sterilization resistance.

The laminates of Comparative Examples 6 to 8 have a siloxane compound-containing layer on the substrate, but the siloxane compound included in this layer does not have a reactive functional group. The laminates of Comparative Examples 6 to 8 each have a primer layer specified in the present invention but have low ethylene oxide gas sterilization resistance and low hydrogen peroxide gas sterilization resistance.

The laminates of Comparative Examples 5, 9, and 10 have a siloxane compound-containing layer on the substrate, but this layer is not porous. The laminates of Comparative Examples 5, 9, and 10 each have a primer layer specified in the present invention but have low ethylene oxide gas sterilization resistance and low hydrogen peroxide gas sterilization resistance.

In contrast, it can be seen that the laminates of the present invention of Examples 1 to 60 have high ethylene oxide gas sterilization resistance and high hydrogen peroxide gas sterilization resistance.

REFERENCE SIGNS LIST

1 substrate
2 siloxane compound-containing porous layer (interlayer)
3 polymer coating layer
4 primer layer (interlayer)

What is claimed is:

1. A laminate comprising a substrate, an interlayer on the substrate, and a polymer coating layer on the interlayer, wherein the interlayer has a porous layer including a siloxane compound and a primer layer on the porous layer, the siloxane compound has at least one of a constituent component derived from a compound bearing a reactive functional group and a hydrolyzable group or a constituent component derived from a compound bearing a hydrolyzable group having a reactive functional group, and the porous layer has an average pore size of 100 nm to 10 μm.

2. The laminate according to claim 1, wherein the reactive functional group includes at least one of an amino group, a (meth)acryloyl group, a mercapto group, a phosphorus-containing group, or an acyl group.

3. The laminate according to claim 1, wherein the interlayer is the porous layer, the siloxane compound included in the porous layer is a dehydrated condensate of at least one of an alkoxysilane compound or a hydroxysilane compound and at least one of a silane coupling agent, a titanium alkoxide compound, a zirconium alkoxide compound, or an aluminum alkoxide compound, and the silane coupling agent, the titanium alkoxide compound, the zirconium alkoxide compound, and the aluminum alkoxide compound have the reactive functional group.

4. The laminate according to claim 3, wherein the siloxane compound included in the porous layer is a dehydrated condensate of at least one of an alkoxysilane compound or a hydroxysilane compound and a silane coupling agent, and the silane coupling agent has the reactive functional group.

5. The laminate according to claim 1, wherein the substrate includes at least one of iron, a nonferrous metal, an inorganic material other than metal, or an organic material.

6. The laminate according to claim 5, wherein the substrate includes the nonferrous metal and the nonferrous metal includes at least one of aluminum, titanium, magnesium, nickel, copper, lead, zinc, tin, chromium, tungsten, cobalt, or an alloy of at least two of these metals.

7. The laminate according to claim 5, wherein the substrate includes the inorganic material other than metal and the inorganic material other than metal includes at least one of glass or ceramic.

8. The laminate according to claim 5, wherein the substrate includes the organic material and the organic material includes at least one of a thermoplastic resin or a thermosetting resin.

9. The laminate according to claim 1, wherein the primer layer has a reactive functional group.

10. The laminate according to claim 9, wherein the reactive functional group of the primer layer includes at least one of an amino group, a (meth)acryloyl group, an epoxy group, a mercapto group, an acid anhydride group, a phosphorus-containing group, a hydroxy group, a carboxy group, a sulfonyl group, or an acyl group.

11. The laminate according to claim 1, wherein the primer layer includes at least one of a silane coupling agent, a titanium alkoxide compound, an aluminum alkoxide compound, or a zirconium alkoxide compound.

12. The laminate according to claim 11, wherein the primer layer includes at least one of a titanium alkoxide compound, an aluminum alkoxide compound, or a zirconium alkoxide compound.

13. The laminate according to claim 12, wherein the primer layer includes a titanium alkoxide compound.

14. The laminate according to claim 11, wherein the primer layer includes the titanium alkoxide compound and the titanium alkoxide compound includes a compound represented by general formula (a) or (b):

$$R^{1a}_{m1}—Ti—(OR^{2a})_{4-m1} \quad \text{General formula (a):}$$

$$O—[Ti—(OR^{2a})_3]_2 \quad \text{General formula (b):}$$

where $R^{1a}$ represents a hydrogen atom, an alkyl group, a cycloalkyl group, an acyl group, an aryl group, or an unsaturated aliphatic group, $R^{2a}$ represents a hydrogen atom, an alkyl group, a cycloalkyl group, an acyl group, an alkenyl group, an aryl group, a phosphonate group, or $—SO_2R^{S1}$, where $R^{S1}$ represents a substituent, and m1 is an integer of 0 to 3.

15. The laminate according to claim 14, wherein the compound represented by general formula (a) or (b) includes at least one atom selected from the group consisting of N, P, and S.

16. The laminate according to claim 11, wherein the primer layer includes the aluminum alkoxide compound and the aluminum alkoxide compound includes a compound represented by general formula (c) or (d):

$$R^{1b}_{m2}—Al—(OR^{2b})_{3-m2} \quad \text{General formula (c):}$$

$$O—[Al—(OR^{2b})_2]_2 \quad \text{General formula (d):}$$

where $R^{1b}$ represents a hydrogen atom, an alkyl group, a cycloalkyl group, an acyl group, an aryl group, or an unsaturated aliphatic group, $R^{2b}$ represents a hydrogen atom, an alkyl group, a cycloalkyl group, an acyl group, an alkenyl group, an aryl group, a phosphonate group, or $—SO_2R^{S2}$, where $R^{S2}$ represents a substituent, and m2 is an integer of 0 to 2.

17. The laminate according to claim 16, wherein in general formulae (c) and (d), at least one $OR^{2b}$ has an acetonato structure or an acetato structure.

18. The laminate according to claim 11, wherein the primer layer includes the zirconium alkoxide compound and the zirconium alkoxide compound includes a compound represented by general formula (e) or (f):

$$R^{1c}_{m3}—Zr—(OR^{2c})_{4-m3} \quad \text{General formula (e):}$$

$$O—[Zr—(OR^{2c})_3]_2 \quad \text{General formula (f):}$$

where $R^{1c}$ represents a hydrogen atom, an alkyl group, a cycloalkyl group, an acyl group, an aryl group, or an unsaturated aliphatic group, $R^{2c}$ represents a hydrogen atom, an alkyl group, a cycloalkyl group, an acyl group, an alkenyl group, an aryl group, a phosphonate group, or $—SO_2R^{S3}$, where $R^{S3}$ represents a substituent, and m3 is an integer of 0 to 3.

19. The laminate according to claim 18, wherein in general formulae (e) and (f), at least one $OR^{2c}$ has an acetonato structure, an acetato structure, or a lactato structure.

20. The laminate according to claim 1, wherein the polymer coating layer includes at least one of a thermoplastic polymer or a thermosetting polymer.

21. The laminate according to claim 1, wherein the polymer coating layer includes a thermoplastic polymer.

22. A medical device comprising the laminate according to claim 1 as a constituent member.

* * * * *